United States Patent
Ono et al.

(10) Patent No.: US 10,242,569 B2
(45) Date of Patent: Mar. 26, 2019

(54) INFORMATION PROVIDING APPARATUS FOR VEHICLE

(71) Applicant: TOYOTA JIDOSHA KABUSHIKI KAISHA, Toyota-shi, Aichi-ken (JP)

(72) Inventors: Sayaka Ono, Susono (JP); Makoto Aso, Mishima (JP); Kazuki Tamura, Susono (JP); Tomoyuki Kuriyama, Hadano (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/402,722

(22) Filed: Jan. 10, 2017

(65) Prior Publication Data

US 2017/0263121 A1   Sep. 14, 2017

(30) Foreign Application Priority Data

Mar. 9, 2016   (JP) .................................. 2016-045658

(51) Int. Cl.
| | |
|---|---|
| G06Q 30/02 | (2012.01) |
| G08G 1/0962 | (2006.01) |
| G06F 3/00 | (2006.01) |
| G08G 1/0967 | (2006.01) |
| H04L 29/08 | (2006.01) |

(52) U.S. Cl.
CPC ........... *G08G 1/09626* (2013.01); *G06F 3/00* (2013.01); *G08G 1/09675* (2013.01); *G08G 1/096716* (2013.01); *G08G 1/096791* (2013.01); *H04L 67/00* (2013.01)

(58) Field of Classification Search
None
See application file for complete search history.

(56) References Cited

U.S. PATENT DOCUMENTS

| | | | |
|---|---|---|---|
| 6,043,757 A | 3/2000 | Patrick | |
| 6,587,043 B1 * | 7/2003 | Kramer | ........................ 340/435 |
| 6,957,128 B1 * | 10/2005 | Ito et al. | ........................... 701/1 |
| 8,718,861 B1 | 5/2014 | Montemerlo et al. | |

(Continued)

FOREIGN PATENT DOCUMENTS

| | | |
|---|---|---|
| EP | 1699032 A1 | 9/2006 |
| JP | 2005-313658 A | 11/2005 |

(Continued)

*Primary Examiner* — Brent Swarthout
(74) *Attorney, Agent, or Firm* — Sughrue Mion, PLLC

(57) ABSTRACT

An information providing apparatus for a vehicle includes: a traffic information database in which traffic information data are recorded; and a data processing device that processes the traffic information data to provide a driver of an assisted vehicle with a notification. The data processing device executes: an event detection process that detects, based on the traffic information data, an impediment event that impediments vehicle running; an event extraction process that extracts the impediment event potentially encountered by the assisted vehicle; a determination value calculation process that calculates a notification necessity level for each impediment event; and a notification process that provides the driver of the assisted vehicle with the notification regarding the impediment event potentially encountered by the assisted vehicle and having the notification necessity level greater than a threshold.

20 Claims, 13 Drawing Sheets

(56) References Cited

U.S. PATENT DOCUMENTS

| | | | |
|---|---|---|---|
| 2006/0232439 A1 | 10/2006 | Reumermann | |
| 2007/0213922 A1* | 9/2007 | Van Buer | G08G 1/0104 |
| | | | 701/117 |
| 2013/0083679 A1 | 4/2013 | Krishnaswamy et al. | |
| 2015/0367770 A1* | 12/2015 | Newton-Dunn | B60Q 1/00 |
| | | | 340/438 |
| 2016/0351050 A1 | 12/2016 | Takahara et al. | |
| 2018/0068358 A1* | 3/2018 | Hoffberg | G06Q 30/0282 |

FOREIGN PATENT DOCUMENTS

| | | |
|---|---|---|
| JP | 2005-339181 A | 12/2005 |
| JP | 2009-205368 A | 9/2009 |
| JP | 2009-277059 A | 11/2009 |
| JP | 2010-237794 A | 10/2010 |
| JP | 2011-133413 A | 7/2011 |
| JP | 2012-18497 A | 1/2012 |
| JP | 2013-544695 A | 12/2013 |
| JP | 2015-194939 A | 11/2015 |
| WO | 2012/047743 A2 | 4/2012 |
| WO | 2015/125516 A1 | 8/2015 |

\* cited by examiner

<STRESS EVENT>

| EVENT EXAMPLE | BASIS FOR JUDGMENT | BASIS DATA |
| --- | --- | --- |
| TAILGATING VEHICLE | HISTORY OF TAILGATING BEHAVIOR: INTER-VEHICLE DISTANCE, SPEED | UPLOADED DATA |
| SELF-PACED LOW-SPEED VEHICLE | HISTORY OF SPEED LIMITING BEHAVIOR: INTER-VEHICLE DISTANCE, SPEED, DIFFERENCE IN SPEED | |
| CUTTING-IN VEHICLE | HISTORY OF CUTTING-IN BEHAVIOR: LANE CHANGE OPERATION, CUTTING-IN BEHAVIOR | |
| HIGH-FREQUENCY BRAKING VEHICLE | HISTORY OF OPERATION: BRAKING FREQUENCY, SPEED, INTER-VEHICLE DISTANCE | |
| MANNER VIOLATION VEHICLE | HISTORY OF MANNER: TURN SIGNAL, RIGHT/LEFT TURN, STARTING/STOPPING | |
| NARROW ROAD | ROAD WIDTH, DIFFERENCE IN ROAD WIDTH | MAP DATA |

Fig. 2

<UNEXPECTED EVENT>

| TYPE | EVENT EXAMPLE | | BASIS DATA | DRIVER SITUATION | | |
|---|---|---|---|---|---|---|
| | | | | LIVING AREA | | OUTSIDE LIVING AREA |
| | | | | ACTIVITY HOUR | OFF-ACTIVITY HOUR | |
| REGULAR EVENT | DECELERATION HUMP APPEARING AROUND BLIND CURVE | | MAP DATA | EXPECTED | EXPECTED | UNEXPECTED |
| | CHRONIC TRAFFIC CONGESTION OCCURRING AROUND BLIND CURVE | | | | | |
| HOUR EVENT | DECELERATION HUMP DURING NIGHT-TIME HOURS | | MAP DATA, TIME | | UNEXPECTED (I) | (I) |
| | CHRONIC TRAFFIC CONGESTION ON HOLIDAY | | | | | |
| | CHRONIC TRAFFIC CONGESTION DURING COMMUTING HOURS | | | | | |
| LOW FREQUENCY EVENT | OCCURRENCE TIME IS BIASED TO SPECIFIC SEASON | ANIMAL | UPLOADED DATA | UNEXPECTED (II) | (II) | (II) |
| | | POT HOLE ON ROAD | | | | |
| | OCCURRENCE INTERVAL IS LONG | DISABLED VEHICLE | | | | |
| | | FALLEN OBJECT (E.G. TIRE) | | | | |
| LOW PROBABILITY EVENT | TRAFFIC SIGNAL THAT SELDOM TURNS RED | | | (III) | (III) | EXPECTED |

Fig. 3

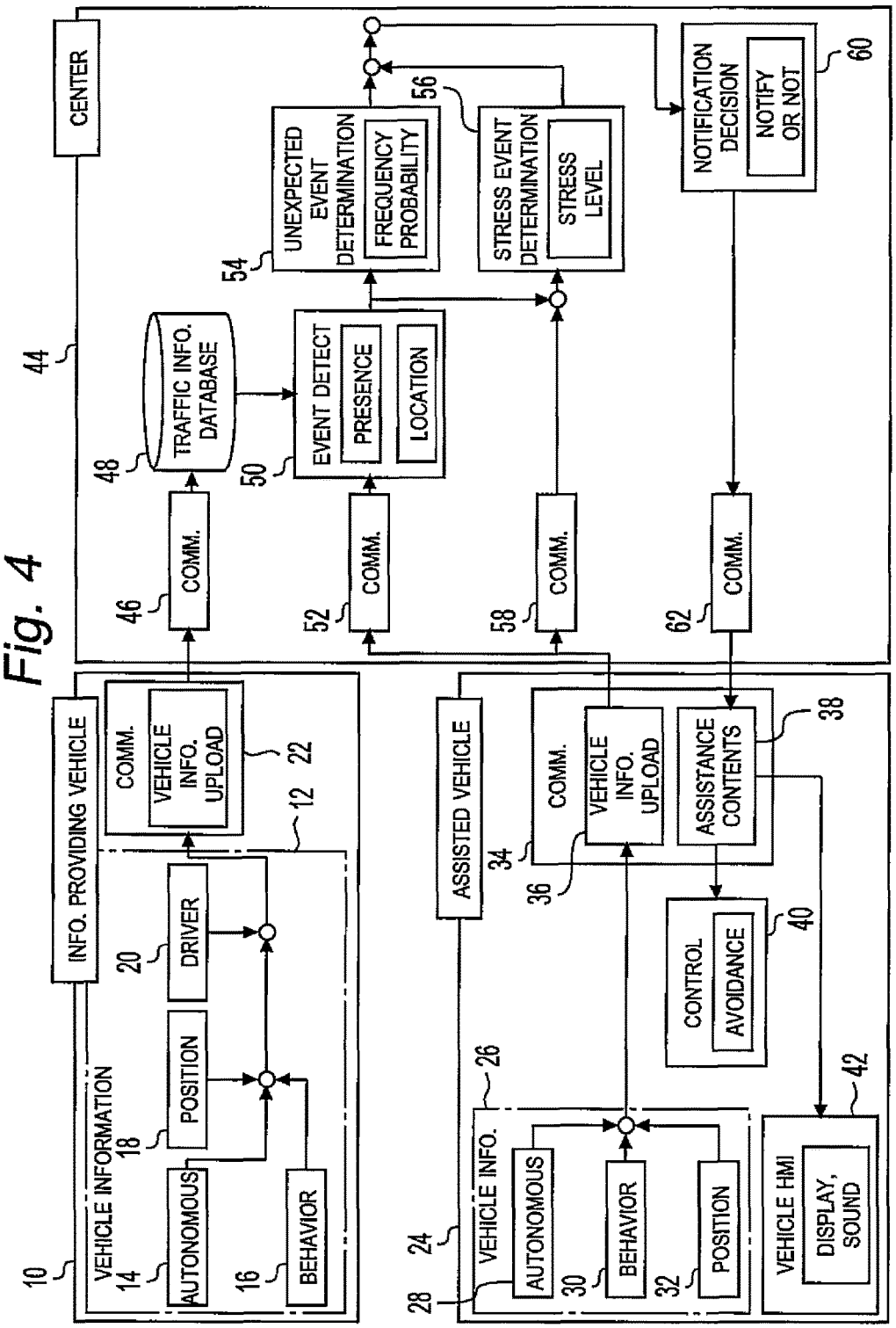

INFORMATION PROVIDING APPARATUS FOR VEHICLE

BACKGROUND

Technical Field

The present invention relates to an information providing apparatus for a vehicle. In particular, the present invention relates to an information providing apparatus for a vehicle that provides a driver of an assisted vehicle with a notification regarding an impediment event.

Background Art

Patent Literature 1 discloses a system for supporting autonomous traveling of a vehicle. A travel route of the vehicle includes not only a zone suitable for the autonomous traveling but also a zone in which the autonomous traveling is hard to carry out. For example, a general region of an expressway in which all surrounding vehicles move in the same direction to go with a flow of traffic is the zone suitable for the autonomous traveling. On the other hand, a junction where a plurality of vehicle flows merge, a roundabout intersection, a complicated grade separation and the like are the zones in which the autonomous traveling is hard to carry out.

The above-mentioned conventional system is based on premise that a driver sets a destination prior to start of the autonomous traveling. When the destination is set, the vehicle calculates a route from the current location to the destination. When the vehicle runs along the calculated route and approaches the zone in which the autonomous traveling is hard to carry out, the vehicle notifies the driver of the approach to the zone. The driver receiving the notification can supplement the autonomous traveling by setting a new route bypassing the zone or manually operating the vehicle during passing through the zone.

LIST OF RELATED ART

Patent Literature 1: JP 2013-544695 A
Patent Literature 2: JP 2005-339181 A

SUMMARY

To receive a notification regarding an impediment event on a travel route is useful for an autonomous traveling vehicle, but not limited to that. For example, when this kind of notification is provided to a general vehicle, a driver of the general vehicle can recognize presence of an impediment event and prepare for it in advance before encountering the impediment event. Therefore, it may be considered to provide the driver of the general vehicle with the notification described in Patent Literature 1.

At the same time, the driver of the vehicle finds a notification of useless information annoying, although the driver welcomes a notification of useful information. For example, if a notification calling for attention is provided every time the vehicle approaches a familiar site such as a junction and a grade separation on a familiar commuting route, the driver finds the notification annoying.

The system described in Patent Literature 1 notifies the driver of approach to the zone in which the autonomous traveling is hard to carry out. That is, the system always notifies the driver of all the impediment events that make it hard to carry out the autonomous traveling. Therefore, if the method of the above-mentioned system is applied to a general vehicle, the driver of the general vehicle is frequently notified of an event that is already visually confirmed, an event that is already empirically predicted, and so forth. In view of this, the system described in Patent Literature 1, when applied to providing the general vehicle with the notification, is likely to annoy the driver of the general vehicle.

The present invention has been made to solve the problem described above. An object of the present invention is to provide an information providing apparatus for a vehicle that selects, as a candidate to be notified to a driver of an assisted vehicle, an impediment event that is potentially encountered by the assisted vehicle and has high level of notification necessity for the driver.

A first invention has the following features in order to achieve the object described above. The first invention is an information providing apparatus for a vehicle, including:

a traffic information database in which traffic information data are recorded; and a data processing device configured to process the traffic information data to provide a driver of an assisted vehicle with a notification.

The data processing device is configured to execute:

an event detection process that detects, based on the traffic information data, an impediment event that impediments vehicle running;

an event extraction process that extracts the impediment event potentially encountered by the assisted vehicle;

a determination value calculation process that calculates a notification necessity level for each of the impediment event; and a notification process that provides the driver of the assisted vehicle with the notification regarding the impediment event potentially encountered by the assisted vehicle and having the notification necessity level greater than a threshold.

A second invention has the following features in the first invention.

The data processing device is further configured to execute a traffic information recording process that records, in the traffic information database, the traffic information data received from an information providing vehicle.

A third invention has the following features in the second invention.

The traffic information data includes: positional information of the information providing vehicle; and vehicle behavior information of the information providing vehicle.

A fourth invention has the following features in the second or third invention.

The traffic information data includes: positional information of the information providing vehicle; and a result of detection by a surrounding monitoring sensor that is installed in the information providing vehicle for monitoring a surrounding situation.

A fifth invention has the following features in any one of the first to fourth inventions.

The determination value calculation process includes an unexpected event determination process that calculates the notification necessity level or the threshold such that the notification regarding the impediment event whose frequency of occurrence is lower is more likely to be provided.

A sixth invention has the following feature in the fifth invention.

The frequency of occurrence becomes lower as a period of occurrence of the impediment event within a defined period of time becomes shorter.

A seventh invention has the following feature in the fifth invention.

The frequency of occurrence becomes lower as an interval of occurrence of the impediment event becomes longer.

An eighth invention has the following feature in any one of the first to seventh inventions.

The determination value calculation process includes an unexpected event determination process that calculates the notification necessity level or the threshold such that the notification regarding the impediment event whose probability of occurrence is lower is more likely to be provided.

A ninth invention has the following feature in the eighth invention.

There is a population of on-road fixed objects. A state of each of the on-road fixed objects is switchable between a plurality of states. The impediment event is caused when the state is switched to one of the plurality of states. The probability of occurrence is defined for each of the on-road fixed objects as probability of occurrence of the one state causing the impediment event.

A tenth invention has the following feature in the ninth invention.

The information providing apparatus for a vehicle further includes a driver information database in which a movement history of the driver of the assisted vehicle is recorded.

The determination value calculation process further includes a visit frequency determination process that calculates, based on the movement history, a frequency of visit by the driver to a place where the assisted vehicle is running.

The unexpected event determination process calculates the notification necessity level or the threshold such that the notification regarding the impediment event related to an on-road fixed object is less likely to be provided as the frequency of visit by the driver to an installation site of the on-road fixed object is lower.

An eleventh invention has the following feature in any one of the first to seventh inventions.

The information providing apparatus for a vehicle further includes a driver information database in which a movement history of the driver of the assisted vehicle is recorded.

The determination value calculation process further includes a visit frequency determination process that calculates, based on the movement history, a frequency of visit by the driver to a place where the assisted vehicle is running.

The determination value calculation process calculates the notification necessity level or the threshold such that the notification regarding the impediment event is more likely to be provided as the frequency of visit by the driver to a location of occurrence of the impediment event is lower.

A twelfth invention has the following feature in the eleventh invention.

The visit frequency determination process calculates the frequency of visit by the driver during current hours.

The determination value calculation process calculates the notification necessity level or the threshold based on the frequency of visit by the driver during the current hours.

A thirteenth invention has the following feature in any one of the first to twelfth inventions.

The information providing apparatus for a vehicle further includes a notification history database in which a history of the notification regarding the impediment event to the assisted vehicle is recorded.

The notification process includes a process that makes an interval of the notification regarding a same impediment event to a same assisted vehicle equal to or more than a certain period of time.

A fourteenth invention has the following feature in any one of the first to thirteenth inventions.

The information providing apparatus for a vehicle further includes a driving skill database in which information regarding a driving skill of the driver of the assisted vehicle is recorded.

The notification process includes a process that makes the notification less likely to be provided to the driver whose driving skill is higher.

A fifteenth invention has the following feature in any one of the first to fourteenth inventions.

The information providing apparatus for a vehicle further includes a setting database in which settings regarding the notification set by the driver of the assisted vehicle are recorded.

The notification process includes a process that reflects the settings in possibility of providing the driver with the notification.

A sixteenth invention has the following feature in any one of the first to fifteenth inventions.

The data processing device is further configured to execute a certainty level calculation process that calculates, based on the traffic information data, a certainty level of the impediment event.

The notification process provides the driver of the assisted vehicle with the notification regarding the impediment event having the certainty level equal to or higher than a notification threshold.

A seventeenth invention has the following feature in any one of the first to sixteenth inventions.

The determination value calculation process includes a stress event determination process that calculates the notification necessity level or the threshold such that the notification regarding the impediment event giving greater stress to the driver is more likely to be provided.

An eighteenth invention has the following feature in the seventeenth invention.

The information providing apparatus for a vehicle further includes a driver information database in which a movement history of the driver of the assisted vehicle is recorded.

The stress event determination process includes:

a process of calculating, based on the movement history, a frequency of encounter by the driver with the impediment event; and a process of calculating the notification necessity level or the threshold such that the notification regarding the impediment event with a higher frequency of encounter is less likely to be provided.

According to the first invention, it is possible to select an impediment event potentially encountered by the assisted vehicle and having a high notification necessity level from the impediment events detected based on the traffic information data and to notify the driver of the selected impediment event. If the driver receives a notification useless for the vehicle driving, the driver finds such the notification annoying. According to the first invention, it is possible to prevent the driver from finding the notification annoying and to prompt the driver to prepare for the impediment event.

According to the second invention, the data processing device can obtain the traffic information data from the information providing vehicle and records the obtained traffic information data in the traffic information database. The information providing vehicle preceding the assisted vehicle can transmit, to the data processing device, information of the impediment event occurring on a travel route of the assisted vehicle. Accordingly, the data processing device can provide the assisted vehicle with the notification regarding the impediment event with which the assisted vehicle does not yet encounter.

According to the third invention, the information providing vehicle transmits its positional information and vehicle behavior information as the traffic information data. The data processing device can recognize occurrence of the impediment event by referring to the vehicle behavior information indicating an avoidance action for example. Moreover, the data processing device can recognize a position of occurrence of the impediment event by referring to the positional information of the information providing vehicle. Therefore, according to the third invention, it is possible to notify the assisted vehicle of the information regarding the impediment event encountered by the information providing vehicle in real time.

According to the fourth invention, the information providing vehicle transmits its positional information and the result of detection by the surrounding monitoring sensor as the traffic information data. The data processing device can detect, based on the result of detection by the surrounding monitoring sensor, the impediment event that occurs around the information providing vehicle. Moreover, the data processing device can recognize a position of occurrence of the impediment event by referring to the positional information of the information providing vehicle. Therefore, according to the fourth invention, it is possible to notify the assisted vehicle of the details of the impediment event encountered by the information providing vehicle in real time.

According to the fifth invention, it is possible to notify the driver of the assisted vehicle of the impediment event with a low frequency of occurrence. The lower the frequency of occurrence of the impediment event becomes, the more the impediment event becomes unexpected for the driver. According to the fifth invention, it is possible to select such the unexpected event and notify the driver of the unexpected event.

According to the sixth invention, an impediment event whose period of occurrence within a defined period of time is short (e.g. a deer appearing only during a certain season) is recognized as the impediment event with a low frequency of occurrence. According to the sixth invention, when this kind of impediment event occurs, it is possible to appropriately call the driver's attention to the impediment event.

According to the seventh invention, an impediment event whose interval of occurrence is long (e.g. a separated wheel left on a road surface) is recognized as the impediment event with a low frequency of occurrence. According to the seventh invention, when this kind of impediment event occurs, it is possible to appropriately call the driver's attention to the impediment event.

According to the eighth invention, it is possible to notify the driver of the assisted vehicle of the impediment event that occurs with a certain frequency but whose probability of occurrence is low (e.g. a vehicle actuated traffic signal that seldom turns red). Such the impediment event with a low probability of occurrence is likely to be an unexpected event for the driver. According to the eighth invention, it is possible to select such the unexpected event and notify the driver of the unexpected event.

According to the ninth invention, a case where on-road fixed objects of the same type form a population and a state of each of the on-road fixed objects is switchable between a plurality of states is considered. Such the on-road fixed objects are exemplified by traffic signals. According to the ninth invention, it is possible to notify the driver of the assisted vehicle of the impediment event that is caused by the on-road fixed object with a low probability. Since there is the population, the driver understands in advance that the on-road fixed object can cause the impediment event with a certain probability. However, when a specific on-road fixed object causes the impediment event with a low probability, the driver knowing the tendency of the specific on-road fixed object may have a preconceived idea that the specific on-road fixed object does not cause the impediment event. In this case, the impediment event caused by the specific on-road fixed object with a low probability is an unexpected event for the driver. According to the ninth invention, it is possible to notify such the unexpected event to appropriately call the driver's attention to the unexpected event.

According to the tenth invention, the frequency of visit by the driver is further taken into consideration. Even when a specific on-road fixed object causes the impediment event with a low probability, the impediment event is hard to be notified to a driver whose frequency of visit to the installation site of the specific on-road fixed object is low. Therefore, the driver whose frequency of visit is low does not have the preconceived idea and supposes that the specific on-road fixed object causes the impediment event with a certain probability. In this case, the driver is likely to be annoyed by receiving the notification of the impediment event. According to the tenth invention, it is possible to appropriately avoid such the inconvenience.

According to the eleventh invention, the notification is more likely to be provided to the driver as the frequency of visit by the driver to a location of occurrence of the impediment event is lower. The impediment event occurring at a specific place is an expected event for a driver whose frequency of visit to the specific place is high. On the other hand, the same impediment event is an unexpected event for a driver whose frequency of visit to the specific place is low. According to the eleventh invention, the movement history of individual driver is taken into consideration, and thus the impediment event unexpected by the driver of the assisted vehicle can be appropriately selected and notified to the driver.

According to the twelfth invention, whether to provide the notification regarding the impediment event can be determined based on the frequency of visit by the driver during the current hours. The impediment event occurring during a specific hour is an expected event for a driver whose frequency of visit during the specific hour is high. On the other hand, the same impediment event is an unexpected event for a driver whose frequency of visit during the specific hour is low. According to the twelfth invention, hours as well as the movement history of individual driver are taken into consideration, and thus the impediment event unexpected by the driver of the assisted vehicle can be appropriately selected and notified to the driver.

According to the thirteenth invention, it is possible to prevent the notification regarding the same impediment event from being provided repeatedly to the same assisted vehicle within a short period of time. If the driver receives another notification regarding the already-notified impediment event, the driver finds it annoying. According to the thirteenth invention, it is possible to appropriately avoid this kind of annoyance.

According to the fourteenth invention, it is possible to prevent the driver having the high driving skill from being frequently provided with the notification regarding the impediment event. Need for the notification to the driver having the high driving skill is lower than need for the notification to the driver having the low driving skill. According to the fourteenth invention, it is possible to provide the driver of the assisted vehicle with the notification regarding the impediment event appropriately in the context of the actual situation.

According to the fifteenth invention, it is possible to reflect the driver's preference in the possibility of providing the driver with the notification.

According to the sixteenth invention, it is possible to prevent the impediment event with a low certainty level from being notified to the driver. It is thus possible according to the sixteenth invention to improve reliability of the notification.

According to the seventeenth invention, the impediment event giving great stress to the driver is to be notified to the driver. The driver receiving the notification can prepare for the impediment event in advance. It is thus possible according to the seventeenth invention to reduce stress experienced by the driver.

According to the eighteenth invention, the notification regarding the impediment event frequently encountered by the driver can be made less likely to be provided to the driver. Even when an impediment event tends to give stress to a general driver, the same impediment event may not give so much stress to a driver familiar with the impediment event. According to the eighteenth invention, it is possible to appropriately prevent the driver from being annoyed by receiving the notification in this case.

BRIEF DESCRIPTION OF DRAWINGS

FIG. 2 is a diagram showing concrete examples of a stress event shown in FIG. 1;

FIG. 3 is a diagram showing concrete examples of an unexpected event shown in FIG. 1;

FIG. 4 is a block diagram for explaining a configuration of a first embodiment of the present invention;

EMBODIMENTS

Overview of Embodiments of Present Invention

An object of embodiments of the present invention is to assist a driver of a vehicle through provision of information. The vehicle as an assistance target is hereinafter referred to as an "assisted vehicle". Various events occur on a travel route of the assisted vehicle. The various events include a stress event, an unexpected event, and an expected event. The stress event is an event that gives great stress to the driver encountering the event and is exemplified by another vehicle having a tendency to tailgate and another vehicle having a tendency to frequently apply a brake. The unexpected event is exemplified by a separated wheel that cannot be recognized until just before encounter. The expected event is exemplified by a usual traffic congestion that occurs everyday.

In general, the driver notified of assistance information welcomes a notification of useful information but finds a notification of useless information annoying. Specifically, notifications of the stress event and the unexpected event among the above-mentioned examples are likely to be welcomed by the driver. On the other hand, the expected event is already known by the driver and thus a notification of the expected event is likely to be annoying. Therefore, according to the embodiments of the present invention, an event to be notified to the driver of the assisted vehicle is limited to the stress event and the unexpected event among the above-mentioned examples, while the expected event is eliminated from the event to be notified. It should be noted that the stress event and the unexpected event are just examples of the event to be notified. An event having a high level of notification necessity also can be appropriately added to the event to be notified.

Figure 1:
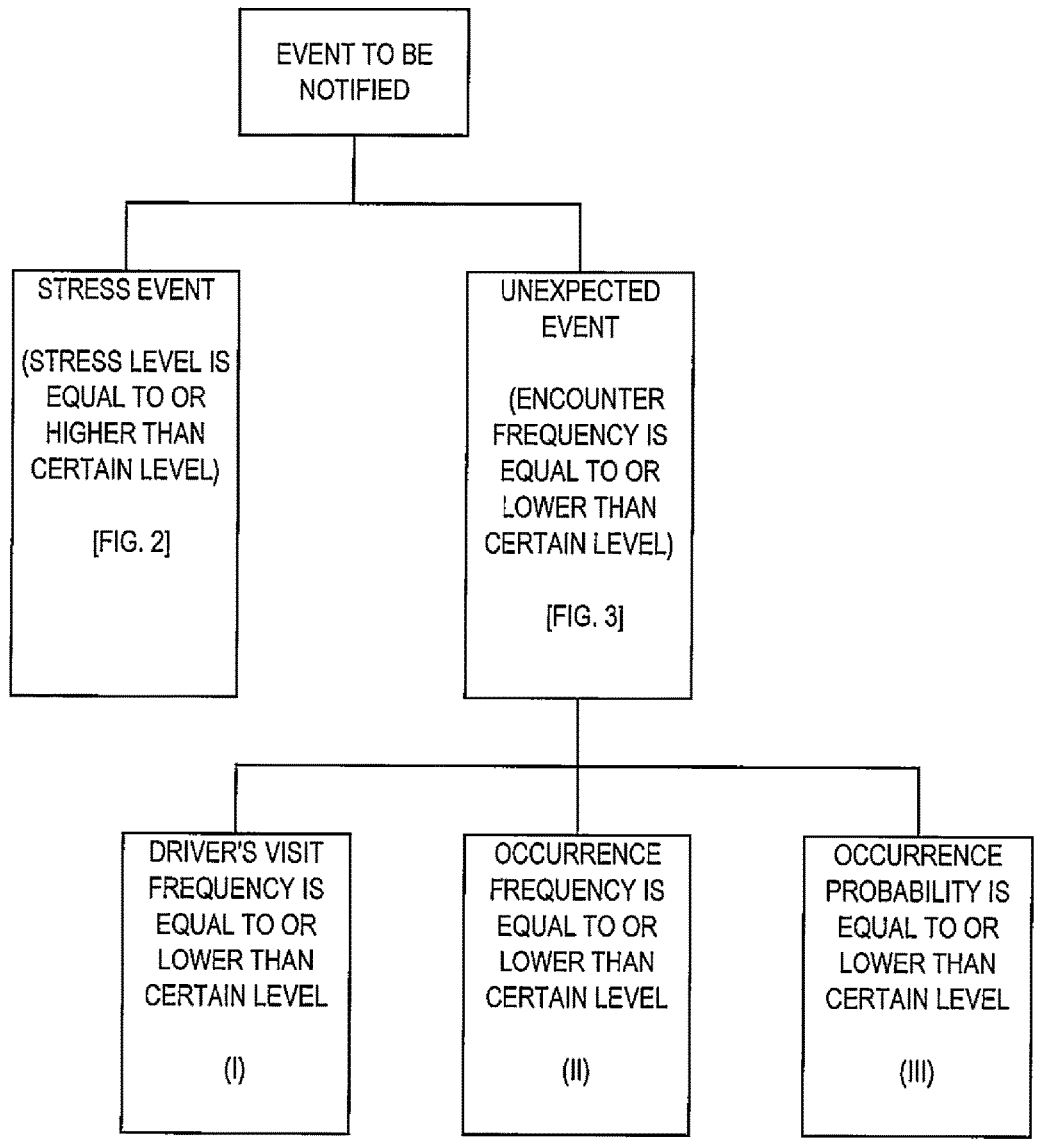
FIG. 1 is a diagram for explaining an overview of an event to be notified to a driver of an assisted vehicle in the present invention.

FIG. 1 is a diagram for explaining an overview of the event to be notified in the embodiments of the present invention. According to the embodiments of the present invention, as shown in FIG. 1, the event to be notified consists of the stress event and the unexpected event. Details of the event to be notified will be described hereinafter with reference to FIGS. 2 and 3 together with FIG. 1.

FIG. 2 is a diagram for explaining concrete examples of the stress event.

A first concrete example is a "tailgating vehicle".
(Definition) The "tailgating vehicle" refers to a vehicle that frequently performs a tailgating behavior that closes a distance to a preceding vehicle to urge the preceding vehicle.
(Basis for judgment) Whether or not a vehicle meets the definition of the "tailgating vehicle" can be judged based on a history of the tailgating behavior of the vehicle. Whether or not a vehicle is performing the tailgating behavior can be judged based on speeds of the vehicle and the preceding vehicle, a distance between the vehicle and the preceding vehicle, and so forth.
(Basis data) The judgment regarding the tailgating behavior can be performed based on uploaded data from the vehicle such as positional information, speed information, and inter-vehicle distance information.

A second concrete example is a "self-paced low-speed vehicle".
(Definition) The "self-paced low-speed vehicle" refers to a vehicle that keeps on running at an obviously lower speed than surrounding or following vehicles.
(Basis for judgment) Whether or not a vehicle meets the definition of the "self-paced low-speed vehicle" can be judged based on a history of a speed limiting behavior that limits a speed of a following vehicle group under a condition that there is no preceding vehicle. Whether or not a vehicle is performing the speed limiting behavior can be judged based on distances between the vehicle and the preceding and following vehicles, a speed of the vehicle, differences in the speed between the vehicle and the surrounding vehicles, a difference in the speed between the vehicle and the following vehicle until the following vehicle closes the distance, the number of following vehicles, and so forth.
(Basis data) The judgment regarding the speed limiting behavior can be performed based on uploaded data from the vehicle such as the positional information, the speed information, and the inter-vehicle distance information.

A third concrete example is a "cutting-in vehicle".

(Definition) The "cutting-in vehicle" refers to a vehicle that frequently performs a cutting-in behavior that cuts in between vehicles in a lane adjacent to the running lane.

(Basis for judgment) Whether or not a vehicle meets the definition of the "cutting-in vehicle" can be judged based on a history of the cutting-in behavior of the vehicle. Whether or not a vehicle is performing the cutting-in behavior can be judged based on a lane change operation in the vehicle, a behavior of a nearby vehicle in the adjacent lane, and so forth.

(Basis data) The lane change operation can be detected based on uploaded data from the vehicle such as steering information, accelerator operation information, brake operation information, the positional information, and the speed information. The behavior of the nearby vehicle due to the cutting-in can be detected based on uploaded data from the nearby vehicle such as positional information, vehicle speed information, and inter-vehicle distance information.

A fourth concrete example is a "high-frequency braking vehicle".

(Definition) The "high-frequency braking vehicle" refers to a vehicle that frequently performs a brake operation. Such the frequent brake operation is likely to be performed by a driver having a tendency to drive the vehicle with closing the distance to the preceding vehicle. When a vehicle follows the high-frequency braking vehicle, a driver of the following vehicle is likely to feel stress because the driver needs to frequently pay attention to the brake operation of the preceding vehicle.

(Basis for judgment) Whether or not a vehicle meets the definition of the "high-frequency braking vehicle" can be judged based on a history of operations in the vehicle. More specifically, whether or not a vehicle meets the definition of the "high-frequency braking vehicle" can be judged based on a frequency of the brake operation in the vehicle, a vehicle speed at the time when the brake operation is performed, the distance to the preceding vehicle, and so forth.

(Basis data) The above-mentioned judgment can be performed based on uploaded data from the vehicle such as the brake operation information, the positional information, the speed information, and the inter-vehicle distance information.

A fifth concrete example is a "manner violation vehicle".

(Definition) The "manner violation vehicle" refers to a vehicle that frequently repeats a manner violation behavior. Here, the "manner violation behavior" is exemplified by a right or left turn without giving a turn signal, stop on a side of a road, start from the side of the road, and so forth.

(Basis for judgment) Whether or not a vehicle meets the definition of the "manner violation vehicle" can be judged based on a history of the manner violation behavior of the vehicle. The "manner violation behavior" can be detected based on operations in the vehicle such as a turn signal operation, a right or left turn operation, an operation of stopping on the side of the road, and an operation of starting from the side of the road.

(Basis data) The above-mentioned detection can be performed based on uploaded data from the vehicle such as a variety of operation information, the positional information, the speed information, and the inter-vehicle distance information.

A sixth concrete example is a "narrow road".

(Definition) The "narrow road" refers to a road whose width is narrow. At an entrance to the narrow road, a driver is likely to feel stress due to decrease in the road width. Moreover, during driving through the narrow road, the driver needs to pay a great deal of attention to the road width and is thus likely to feel stress.

(Basis for judgment) Whether the vehicle approaches the narrow road can be judged based on the road width or a difference in the road width.

(Basis data) The above-mentioned judgment can be performed based on map data that is prepared in advance.

Referring back to FIG. 1, the "unexpected event" in the embodiments of the present invention will be described next. In the embodiments of the present invention, the "unexpected event" refers to the impediment event whose frequency of encounter by the driver is equal to or less than a certain level. The impediment event whose frequency of encounter is equal to or lower than a certain level can be classified into three categories (I), (II), and (III) as shown in FIG. 1.

The first category (I) includes the following impediment event; that is, a frequency of visit by the driver to a location of occurrence of the impediment event is equal to or lower than a certain level, and accordingly the frequency of encounter with the impediment event is low. Specifically, the impediment event itself occurs steadily or frequently, but the driver seldom visits the location of occurrence of the impediment event.

The second category (II) includes the impediment event whose frequency of occurrence is equal to or lower than a certain level. The impediment event belonging to the category (II) can be further classified into the following two categories.

(II-i) The impediment event whose occurrence time is biased to a certain time. In other words, the impediment event whose period of occurrence within a defined period of time is less than a threshold. For example, a deer appearing only during a certain season corresponds to this category.

(II-ii) The impediment event whose number of occurrences within a defined period of time is less than a threshold. Or, the impediment event whose interval of occurrence (i.e. an elapsed time from the previous occurrence) at the location of occurrence is equal to or more than a threshold. For example, a separated wheel left on a lane of an expressway corresponds to this category.

The third category (III) includes the impediment event whose frequency of occurrence is not so low but whose probability of occurrence is lower than a threshold. For example, a traffic signal that seldom turns red corresponds to this category.

FIG. 3 is a diagram for explaining concrete examples of the unexpected event. In FIG. 3, the unexpected event is classified into four types depending on characteristics.

A first type is a "regular event". The regular event is the impediment event that is always present at a specific location.

Event Example

For example, a deceleration hump appearing around a blind curve, and a chronic traffic congestion occurring around a blind curve belong to the first type.

(Basis Data)

This type of event can be detected based on uploaded data from individual vehicles and a traffic information infrastructure. Alternatively, this type of event, which is always present at a specific location, can also be detected based on a map data in which its information is registered. The vehicle and infrastructure that upload the data are hereinafter collectively referred to as "information providing vehicle and the like".
(Driver Situation)

The regular event is a daily event for a driver whose living area includes a location of occurrence of the regular event. Therefore, in a case where the target of assistance is the driver within the living area, it is reasonable to treat the regular event as the expected event. On the other hand, the regular event is not a daily event for a driver outside the living area such as a driver who visits the location of occurrence of the regular event during the trip. Therefore, according to the embodiments of the present invention, the regular event is treated as the unexpected event for the driver outside the living area. This treatment corresponds to the category (I) shown in FIG. 1.

A second type shown in FIG. 3 is an "hour event". The hour event is the impediment event that routinely occurs at a specific location during specific hours.

Event Example

For example, a deceleration hump that can be easily seen from a long distance during daytime hours but is hard to recognize and thus becomes the impediment event during night-time hours, chronic traffic congestion that occurs at a specific location only on a holiday, and chronic traffic congestion that occurs at a specific location only during commuting hours belong to the second type.
(Basis Data)

The hour event fixed on a road such as the deceleration hump can be detected based on time information and the uploaded data from the information providing vehicle and the like or the map data in which information of the hour event fixed on the road is registered. On the other hand, the hour event such as the chronic traffic congestion can be detected based on the uploaded data from the information providing vehicle and the like.
(Driver Situation)

The hour event is a daily event for a driver whose living area includes a location of occurrence of the hour event and whose activity hour (i.e. time of visit to the location of occurrence) overlaps an hour of occurrence of the hour event. Therefore, with respect to the driver whose living area and activity hour respectively overlap the location of occurrence and the hour of occurrence of the hour event, it is reasonable to treat the hour event as the expected event. On the other hand, the hour event is not a daily event for a driver whose living area includes the location of occurrence of the hour event but whose activity hour does not overlap the hour of occurrence of the hour event. Similarly, the hour event is not a daily event for a driver outside the living area. Therefore, according to the embodiments of the present invention, the hour event is treated as the unexpected event for the driver during off-activity hour and the driver outside the living area. This treatment corresponds to the category (I) shown in FIG. 1.

A third type shown in FIG. 3 is a "low frequency event". The "low frequency event" corresponds to the impediment event that belongs to the category (II) shown in FIG. 1.

Event Example

For example, an animal (typically, a deer) that appears intensively during a certain season, and a pot hole that appears on a road intensively at a thawing season belong to the third type (especially the above-mentioned category (II-i)). Moreover, a disabled vehicle stopping on a road, and a separated wheel left on an expressway also belong to the third type (especially the above-mentioned category (II-ii)).
(Basis Data)

The impediment event belonging to the low frequency event can be detected based on the uploaded data from the information providing vehicle and the like.
(Driver Situation)

The low frequency event is not a daily event for any driver. Therefore, according to the embodiments of the present invention, the low frequency event is treated as the unexpected event for all the drivers.

A fourth type shown in FIG. 3 is a "low probability event". The "low probability event" corresponds to the impediment event that belongs to the category (III) shown in FIG. 1. More specifically, the low probability event refers to the impediment event that is realized with an extremely low probability in an on-road fixed object installed at a specific location. The on-road fixed object belongs to a population consisting of a large number of the same kind of on-road fixed objects. Each of the on-road fixed objects belonging to the population operates to switch its state between a plurality of states. One of the plurality of states causes the impediment event that impediments the vehicle running. Since the large number of on-road fixed objects belonging to the population behave in a similar manner, the driver understands that each of the on-road fixed objects can cause the impediment event with a certain probability. Under the circumstances, let us consider a case where only a specific on-road fixed object operates to cause the impediment event with a remarkably lower probability as compared with other on-road fixed objects. In this case, a driver familiar with the operation of the specific on-road fixed object comes to have a preconceived idea that the specific on-road fixed object would not cause the impediment event. Under this situation, the impediment event caused by the specific on-road fixed object is the unexpected event for the driver.

Event Example

For example, a vehicle actuated traffic signal that is installed on a highway and seldom turns red belongs to the fourth type.
(Basis Data)

The impediment event belonging to the low probability event can be detected based on the uploaded data from the information providing vehicle and the like (including the on-road fixed object itself).
(Driver Situation)

The low probability event is the unexpected event for the driver having the preconceived idea that the specific on-road fixed object seldom causes the impediment event. However, the low probability event may be an expected event for the driver outside the living area who does not have such the preconceived idea. Therefore, according to the embodiments of the present invention, the low probability event may be excluded from the unexpected event in the case of the driver outside the living area, although the low probability event is treated as the unexpected event at least for the driver within the living area.

First Embodiment

Configuration of First Embodiment

FIG. 4 is a diagram for explaining a configuration of an information providing apparatus for a vehicle according to a first embodiment of the present invention. As shown in FIG. 4, a system of the present embodiment includes an information providing vehicle 10. Although a single information providing vehicle 10 only is shown in FIG. 4 for the sake of convenience, there are practically a lot of information providing vehicles 10. In the present system, the information providing vehicle 10 plays a role of a supply source of a variety of information obtained on a road. An information supply source in the present embodiment includes not only the information providing vehicle 10 but also various infrastructures such as a sensor for detecting amount of traffic and a monitoring camera (not shown) that can obtain traffic information. The information providing vehicle 10 and those infrastructures are hereinafter collectively referred to as "information providing vehicle and the like".

The information providing vehicle 10 has a vehicle information unit 12. The vehicle information unit 12 is a unit that obtains a variety of information regarding the information providing vehicle 10. The vehicle information unit 12 includes an autonomous sensor unit 14. The autonomous sensor unit 14 includes a surrounding monitoring sensor for detecting information required for autonomous traveling of the information providing vehicle 10. More specifically, the autonomous sensor unit 14 includes surrounding monitoring sensors such as a millimeter-wave radar, a laser radar, an on-vehicle camera. By using the millimeter-wave radar and the laser radar, it is possible to detect presence of objects including other vehicles, distances to the objects, and so forth. By using the on-vehicle camera, it is possible to recognize white lines, pedestrians, bicycles and so forth on the road.

The vehicle information unit 12 further includes a vehicle behavior unit 16. The vehicle behavior unit 16 includes a variety of sensors for detecting a behavior of the information providing vehicle 10. For example, the vehicle behavior unit 16 can detect a speed, an acceleration, a yaw rate, an accelerator opening, a brake oil pressure, a steering angle, a steering angular velocity, and so forth.

The vehicle information unit 12 further includes a positional information unit 18. The positional information unit 18 includes a GPS (Global Positioning System) device. By using the positional information unit 18, it is possible to detect a position of the information providing vehicle 10.

The vehicle information unit 12 further includes a driver information unit 20. The driver information unit 20 includes an input interface for receiving driving skill information self-reported by a driver or a unit for diagnosing a driving skill of the driver. Here, the driving skill of the driver can be judged by a well known method based, for example, on a jerk of the vehicle, namely a differential value da/dt of the acceleration a. Moreover, the driver information unit 20 includes an input interface for receiving various settings and requests from the driver.

A variety of vehicle information detected by the vehicle information unit 12 is supplied to the communication unit 22. The communication unit 22 has a communication function for uploading the vehicle information.

The system of the present embodiment further includes an assisted vehicle 24 in addition to the above-described information providing vehicle 10. The assisted vehicle 24 has a vehicle information unit 26 for detecting information regarding the assisted vehicle 24. In the present embodiment, the vehicle information unit 26 of the assisted vehicle 24 includes an autonomous sensor unit 28, a vehicle behavior unit 30, and a positional information unit 32. These functions are similar to those of the information providing vehicle 10, and an overlapping description thereof is omitted here.

The assisted vehicle 24 has a communication unit 34 that receives detected information supplied from the vehicle information unit 26. The communication unit 34 includes a vehicle information upload unit 36 for uploading a variety of detected information received from the vehicle information unit 26 to the outside of the assisted vehicle 24. Moreover, the communication unit 34 includes an assistance contents reception unit 38 for receiving assistance contents supplied from the outside of the assisted vehicle 24.

The assistance contents that the assistance contents reception unit 38 externally receives include an avoidance control instruction and a notification instruction. The avoidance control instruction is supplied to a control unit 40 of the assisted vehicle 24. The control unit 40 has a function of achieving a variety of avoidance controls in accordance with the avoidance control instruction. Here, the avoidance control refers to a control that controls a driving force, a braking forth of each wheel, a steering angle and the like to cause the assisted vehicle 24 to take necessary actions for avoiding the impediment event.

The notification instruction is supplied from the assistance contents reception unit 38 to a vehicle HMI (Human Machine Interface) unit 42. The vehicle HMI unit 42 is an interface for notifying the driver of the assisted vehicle 24 of the instructed notification. More specifically, the vehicle HMI unit 42 executes display/sound/audio control for providing the driver with the notification through display, sound, and audio.

The system of the present embodiment further includes a center 44 that processes the uploaded data from the information providing vehicle and the like and the assisted vehicle 24, and provides the assisted vehicle 24 with the assistance contents. The center 44 has a storage device, a processor, an input-output interface, a communication device and so forth.

More specifically, the center 44 includes a communication unit 46 that receives the uploaded data from the information providing vehicle and the like. The data received by the communication unit 46 are recorded in a traffic information database 48. Specifically, the following two kinds of traffic information data are uploaded to the traffic information database 48.

1. Data regarding the driver of the information providing vehicle 10

(Contents) The driver skill that is self-reported or diagnosed.

The settings by the driver and the requests from the driver

2. Data regarding the impediment event.

(Contents) "Event data" indicating an event whose presence and details are identified based on images obtained by the on-vehicle camera and the like.

"Base data" used for determining presence and details of an event, such as the vehicle behavior of the information providing vehicle 10 and a result of measurement by the millimeter-wave radar.

"Positional information" indicating a location of occurrence of the information.

The data accumulated in the traffic information database 48 are supplied to an event detection unit 50 of the center 44. The event detection unit 50 performs the following processing based on the above-mentioned 2. "data regarding the impediment event".

(1) detecting, based on the above-mentioned "event data", the impediment event.

(2) detecting, based on the above-mentioned "base data", an event that can be estimated to be the impediment event (this kind of event also is hereinafter referred to as the "impediment event").

(3) identifying, based on the above-mentioned "positional information", a location of each impediment event detected by the above-mentioned Steps (1) and (2).

The positional information of the assisted vehicle 24 also is supplied to the event detection unit 50 through a communication unit 52. The event detection unit 50 further performs the following processing based on the positional information.

(4) estimating a travel route of the assisted vehicle 24.

(5) extracting the impediment event existing on the travel route estimated by the above-mentioned Step (4) from the impediment events whose locations are identified by the above-mentioned Step (3).

By performing the above-described processing (1) to (5), the event detection unit 50 can detect the impediment event which the assisted vehicle 24 is likely to encounter from now.

The data regarding the impediment event detected by the event detection unit 50 is supplied to an unexpected event determination unit 54. The unexpected event determination unit 54 executes a frequency determination process and a probability determination process in order to determine whether or not the impediment event corresponds to an unexpected event. In the frequency determination process, it is determined whether or not the event detected by the event detection unit 50 corresponds to an event whose occurrence frequency is low, namely, the event belonging to the category (II) shown in FIG. 1, that is, the "low frequency event" shown in FIG. 3. On the other hand, in the probability determination process, it is determined whether or not the event detected by the event detection unit 50 corresponds to an event whose occurrence probability is low, namely, the event belonging to the category (III) shown in FIG. 1, that is, the "low probability event" shown in FIG. 3.

A large number of data regarding the impediment events are accumulated in the center 44. Moreover, a threshold used for determining whether the impediment event is the low frequency event and a threshold used for determining whether the impediment event is the low probability event are stored in the center 44. The threshold is a limit value of the occurrence frequency or the occurrence probability that a general driver feels the determination-target event unexpected. The unexpected event determination unit 54 analyzes a large number of data to calculate the occurrence frequency and the occurrence probability of the impediment event being the determination-target event, and then compares the occurrence frequency and the occurrence probability with the above-mentioned thresholds, respectively, to execute the frequency determination process and the probability determination process.

The data regarding the impediment event detected by the event detection unit 50 is supplied also to a stress event determination unit 56. The uploaded data from the assisted vehicle 24 also is supplied to the stress event determination unit 56 through a communication unit 58. The stress event determination unit 56 executes a stress level determination process that determines whether or not the event detected by the event detection unit 50 corresponds to the stress event (see FIGS. 1 and 2) for the assisted vehicle 24.

Various rules (maps and the like) for calculating a stress level for each impediment event are stored in the center 44. For example, regarding the "tailgating vehicle", a rule for calculating the stress level based on parameters such as a frequency of tailgating by the tailgating vehicle, degree of tailgating (calculated based on the speed and the inter-vehicle distance), and a distance between the tailgating vehicle and the assisted vehicle 24 is stored. Regarding the "self-paced low-speed vehicle" and the "cutting-in vehicle", a rule for calculating the stress level based on parameters such as a frequency of the impediment action by the vehicle, degree of the impediment action, and a distance between the vehicle and the assisted vehicle 24 is stored. Regarding the on-road fixed object such as the narrow road, a rule for calculating the stress level based on a map data including parameters such as a road width, a difference in the road width at a position where the road width changes, presence or absence of a guardrail is stored. Furthermore, a threshold being a limit value of the stress level that a general driver feels intolerable is stored in the center 44. The stress event determination unit 56 calculates the stress level of each event and compares the calculated stress level with the above-mentioned threshold to execute the stress level determination process.

The data of the event that is judged by the unexpected event determination unit 54 as the unexpected event and the data of the event that is judged by the stress event determination unit 56 as the stress event are supplied to a notification decision unit 60. The notification decision unit 60 performs processing for making a final judgment on whether or not to notify the driver of the assisted vehicle 24 of the event.

Regarding some impediment events or all the impediment events, a not-to-be-notified condition is stored in the center 44. As an example, let us consider a fallen object such as a tire. When there is no preceding vehicle, a driver can recognize the fallen object (event) at a distance sufficient for preparing in advance. Therefore, regarding the fallen object such as a tire, "there is no preceding vehicle in front of the assisted vehicle 24" is defined as the not-to-be-notified condition. The notification decision unit 60 judges whether or not the not-to-be-notified condition is satisfied, with respect to each event that is judged as the unexpected event or the stress event. If the not-to-be-notified condition regarding the judgement-target event is not satisfied, the notification decision unit 60 issues the notification instruction regarding the event and, if necessary, the avoidance control instruction for assisting the assisted vehicle 24 to avoid the event.

The notification instruction and the avoidance control instruction issued by the notification decision unit 60 are supplied through a communication unit 62 to the assistance contents reception unit 38 of the assisted vehicle 24. When receiving the instructions, the assisted vehicle 24 notifies the driver of an advance notice of the unexpected event or the stress event and, if necessary, executes the avoidance control for avoiding the event.

Operation in First Embodiment

Figure 5:
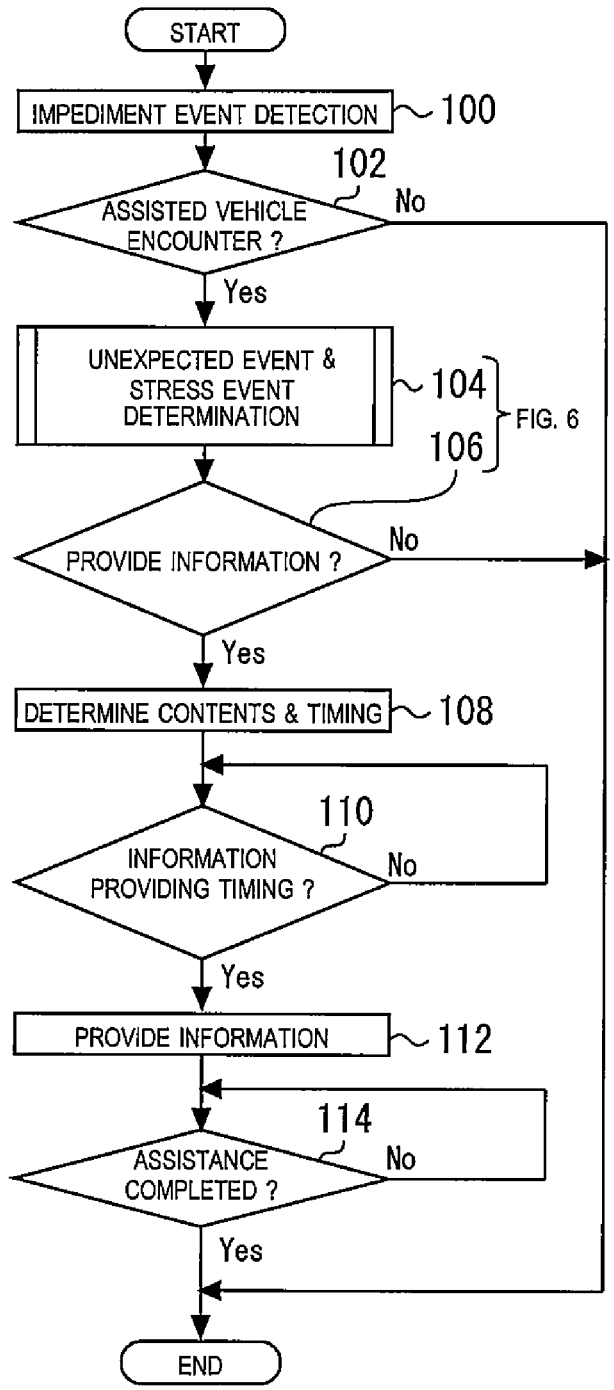
FIG. 5 is a flow chart for explaining an overview of processes executed in a center shown in FIG. 4.

FIG. 5 is a flow chart for explaining an overview of processes executed in the center 44 in the first embodiment of the present invention. It should be noted that the process of recording the uploaded data from the information providing vehicle and the like in the traffic information database 48 is executed separately from a routine shown in FIG. 5.

In the routine shown in FIG. 5, a process of detecting the impediment event is first executed (Step 100). More specifically, an event that is potentially the unexpected event or the stress event is detected based on the data recorded in the traffic information database 48. The process at the present Step 100 corresponds to the above-mentioned (1) and (2) processes executed by the event detection unit 50 shown in FIG. 4.

After the event that is potentially the impediment event is detected, whether or not the assisted vehicle 24 potentially encounters the detected impediment event is determined (Step 102). More specifically, a location of the impediment event is first identified based on the positional information recorded in the traffic information database 48. Next, a travel route of the assisted vehicle 24 is estimated based on the uploaded data from the assisted vehicle 24. If the travel route of the assisted vehicle 24 potentially overlaps the location of occurrence of the impediment event, the determination at the present Step 102 results in "YES". These processes correspond to the above-mentioned (3) to (5) processes executed by the event detection unit 50 shown in FIG. 4.

If the determination at Step 102 results in "NO", then the processing in the current cycle is ended and the process of the above-mentioned Step 100 is started again. On the other hand, if it is judged that the impediment event detected in the current cycle is potentially encountered by the assisted vehicle 24, then the processes by the unexpected event determination unit 54 and the stress event determination unit 56 are executed (Step 104).

Figure 6:
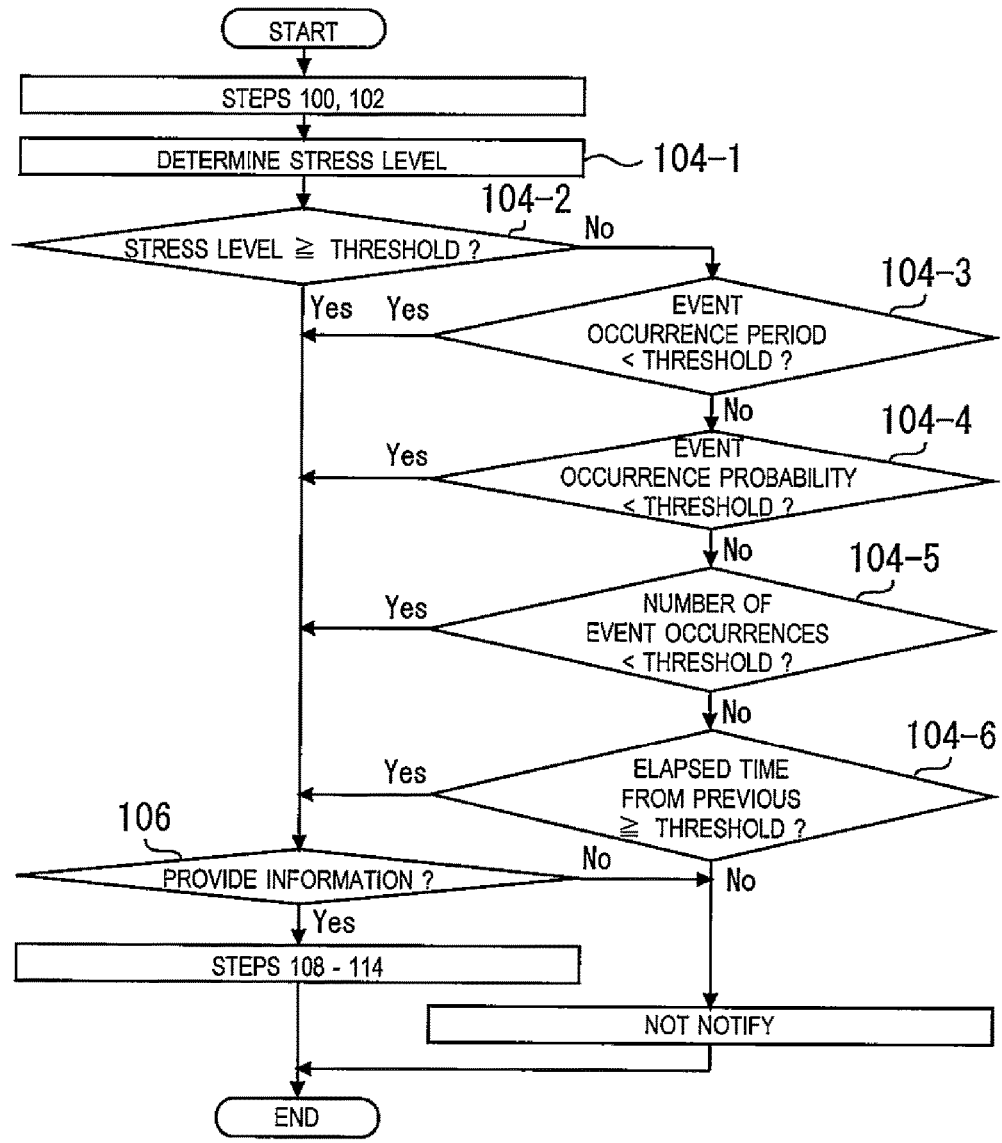
FIG. 6 is a flow chart for explaining details of Steps 104 and 106 shown in FIG. 5.

FIG. 6 is a flow chart for explaining the details of the above-mentioned Step 104. In Step 104, it is determined whether or not the impediment event detected in the current cycle corresponds to the unexpected event or the stress event that is to be notified to the driver. As shown in FIG. 6, the stress level of the impediment event being the determination-target is first determined (Step 104-1). As described above, various rules (maps and the like) for calculating the stress level for each impediment event are stored in the center 44. The stress level of the impediment event is determined according to the rule.

After the process at Step 104-1 is completed, it is determined whether or not the stress level is equal to or greater than the threshold for determining notification necessity (Step 104-2). As described above, the threshold of the stress level for each impediment event is stored in the center 44. At the present Step 104-2, the above-mentioned stress level is compared with the threshold for the impediment event being the determination-target.

If it is determined that the stress level is equal to or greater than the threshold, it is possible to judge that the impediment event being the determination-target corresponds to the stress event that should be notified to the driver. In this case, a final judgment on whether to provide the driver with the information regarding the stress event is subsequently made (Step 106). This process corresponds to the process by the notification decision unit 60 shown in FIG. 4. That is, in Step 106, it is judged whether or not the not-to-be-notified condition regarding the impediment event being the judgment target is satisfied. If the not-to-be-notified condition is satisfied, the final judgment as to the target impediment event results in "not-to-be-notified". On the other hand, if the not-to-be-notified condition is not satisfied, processes for notifying the driver of the stress event are executed thereafter.

If it is determined at the above-mentioned Step 104-2 that the stress level of the target impediment event is less than the threshold, then it is determined whether or not the target impediment event satisfies a first condition of the low frequency event, namely, a condition that "the period of event occurrence within a defined period of time is less than a threshold" (Step 104-3). In the center 44, statistical processing with regard to the time of occurrence of the impediment event is performed based on the large amount of data accumulated. The above-mentioned "defined period of time" is exemplified by one year, one month, one week, and so forth. The above-mentioned "threshold" is set in consideration of the "defined period of time" and is set to be sufficiently shorter than the "defined period of time". If the target impediment event is the one that occurs in a limited period (specific season, period, or hour, for example) within the defined period of time, it is determined in the present Step 104-3 that the above-mentioned first condition is satisfied.

If it is determined that the first condition is satisfied, it is possible to judge that the target impediment event corresponds to the low frequency event that should be notified to the driver. In this case, the process of Step 106 is executed thereafter. On the other hand, if it is determined that the above-mentioned first condition is not satisfied, then it is determined whether or not the target impediment event satisfies a condition of the low probability event (Step 104-4). More specifically, it is first determined whether or not the target impediment event occurs in an on-road fixed object belonging to a population being a group of the same kind of objects. If the determination results in "YES", then it is determined whether or not a probability of the on-road fixed object causing the impediment event is less than a threshold. The threshold is an upper limit value of a range of the probability in which a general driver has a preconceived idea that the on-road fixed object seldom causes the impediment event. For example, the threshold is set to 10%, 5%, 3%, or 1%.

If the determination at the above-mentioned Step 104-4 results in "YES", it is possible to judge that the target impediment event corresponds to the low probability event that should be notified to the driver. In this case, the process of Step 106 is executed thereafter. On the other hand, if the determination at Step S104-4 results in "NO", then it is determined whether or not the target impediment event satisfies a second condition of the low frequency event, namely, a condition that "the number of event occurrences within a defined period of time is less than a threshold" (Step 104-5). In the center 44, statistical processing with regard to the number of occurrences of the impediment event is performed based on the large amount of data accumulated. The above-mentioned "defined period of time" is exemplified by one year, one month, one week, and so forth. The above-mentioned "threshold" is set in consideration of the "defined period of time" and is set to be one to several times. If the target impediment event is not the one occurring routinely, it is determined in the present Step 104-5 that the above-mentioned second condition is satisfied.

If the determination at the above-mentioned Step 104-5 results in "YES", it is possible to judge that the target impediment event corresponds to the low frequency event that should be notified to the driver. In this case, the process of Step 106 is executed thereafter. On the other hand, if the determination at Step S104-5 results in "NO", then it is determined whether or not the target impediment event satisfies a third condition of the low frequency event, namely, a condition that "an elapsed time from the previous occurrence at the location of occurrence is equal to or more than a threshold" (Step 104-6). The location, date and time of occurrence of individual impediment event are recorded in the center 44. The above-mentioned determination at Step 104-6 is made based on such the record. The threshold used in the present Step 104-6 is exemplified by several years, one year, one month, and so forth.

If the determination at the above-mentioned Step 104-6 results in "YES", it is possible to judge that the target impediment event corresponds to the low frequency event that should be notified to the driver. In this case, the process of Step 106 is executed thereafter. On the other hand, if the determination at Step S104-6 results in "NO", it is possible to judge that the target impediment event is not the event that should be notified to the driver. In this case, the center 44 makes a decision that the event is not to be notified, and then ends the processes of the current cycle.

Referring back to FIG. 5, processes after Step 106 will be described. If it is determined at Step 106 that the impediment event is to be notified to the driver, then contents of an instruction to be provided to the assisted vehicle 24 and timing of providing the instruction are determined (Step 108). Contents (messages and the like) of the notification to be provided to the assisted vehicle 24 and contents of the avoidance control for each impediment event are stored in the center 44. At Step 108, the contents of the notification and the contents of the avoidance control with respect to the target impediment event are identified. It is necessary to set the timing of notification to be an appropriate time before a timing at which the assisted vehicle 24 actually encounters the impediment event. For example, an appropriate timing of providing the notification is determined based on a distance between the present location and the location of occurrence of the impediment event, a speed of the assisted vehicle 24, and so forth.

After the above-mentioned process at Step 108 is completed, the determination process is repeated until the timing of providing the notification comes (Step 110). When the timing comes, the notification and information required for the avoidance control are provided from the center 44 to the assisted vehicle 24 (Step 112). After that, the center 44 executes and completes the other processes necessary for the assistance (Step 114), and then ends the processes of the current cycle.

According to the system of the present embodiment, as described above, it is possible to appropriately notify the assisted vehicle 24 of only the information regarding the impediment event that the driver finds useful. Therefore, according to the system, it is possible to provide the driver of the assisted vehicle 24 with the notification useful for continuing safety driving, without annoying the driver.

In the above description, the processes from Step 100 to Step 114 are executed in series. However, the method of executing the processes is not limited to that. The processes can be executed in a different order or in parallel, depending on specification of hardware.

Modification Examples of First Embodiment

In the first embodiment described above, the event detection unit 50 first detects the impediment events and then extracts, from the detected impediment events, the impediment event that exists on the travel route of the assisted vehicle 24. However, the method is not limited to that. For example, it is also possible that the event detection unit 50 first extracts data uploaded from the travel route of the assisted vehicle 24 and then analyzes the extracted data to detect the impediment event.

In the first embodiment described above, the threshold is set with respect to each kind of the impediment event, and the parameter such as the frequency of occurrence, the probability of occurrence, and the stress level of the target impediment event is compared with the threshold to perform the determination process regarding the target impediment event. However, the method of the determination process is not limited to that. For example, it is also possible that a notification necessity level is set with respect to each kind of the impediment event, and the threshold is changed based on the parameter such as the frequency of occurrence, the probability of occurrence, and the stress level of the impediment event.

In the first embodiment described above, the contents of the notification regarding each impediment event and the contents of the avoidance control are provided from the center 44 to the assisted vehicle 24. However, the method of providing information from the center 44 to the assisted vehicle 24 is not limited to that. For example, it is also possible that only the information of the impediment event is provided from the center 44 to the assisted vehicle 24, and the contents of the notification regarding the impediment event and the contents of the avoidance control are determined on the side of the assisted vehicle 24.

In the first embodiment described above, the center 44 determines the timing of notification. However, the method is not limited to that. For example, the processes of Step S108 and thereafter shown in FIG. 5 can be executed on the side of the assisted vehicle 24.

In the first embodiment described above, all the information is accumulated in the database of the center 44. However, the method of storing information is not limited to that. For example, a part of the information can be stored in the vehicle.

By the way, in the first embodiment described above, the frequency of occurrence, the probability of occurrence, and the stress level of the impediment event correspond to the "notification necessity level" in the first invention. Moreover, in the first embodiment, the processor, the storage device, the communication device and so forth of the center 44 constitute the "data processing device" in the first invention.

Second Embodiment

Configuration of Second Embodiment

Figure 7:
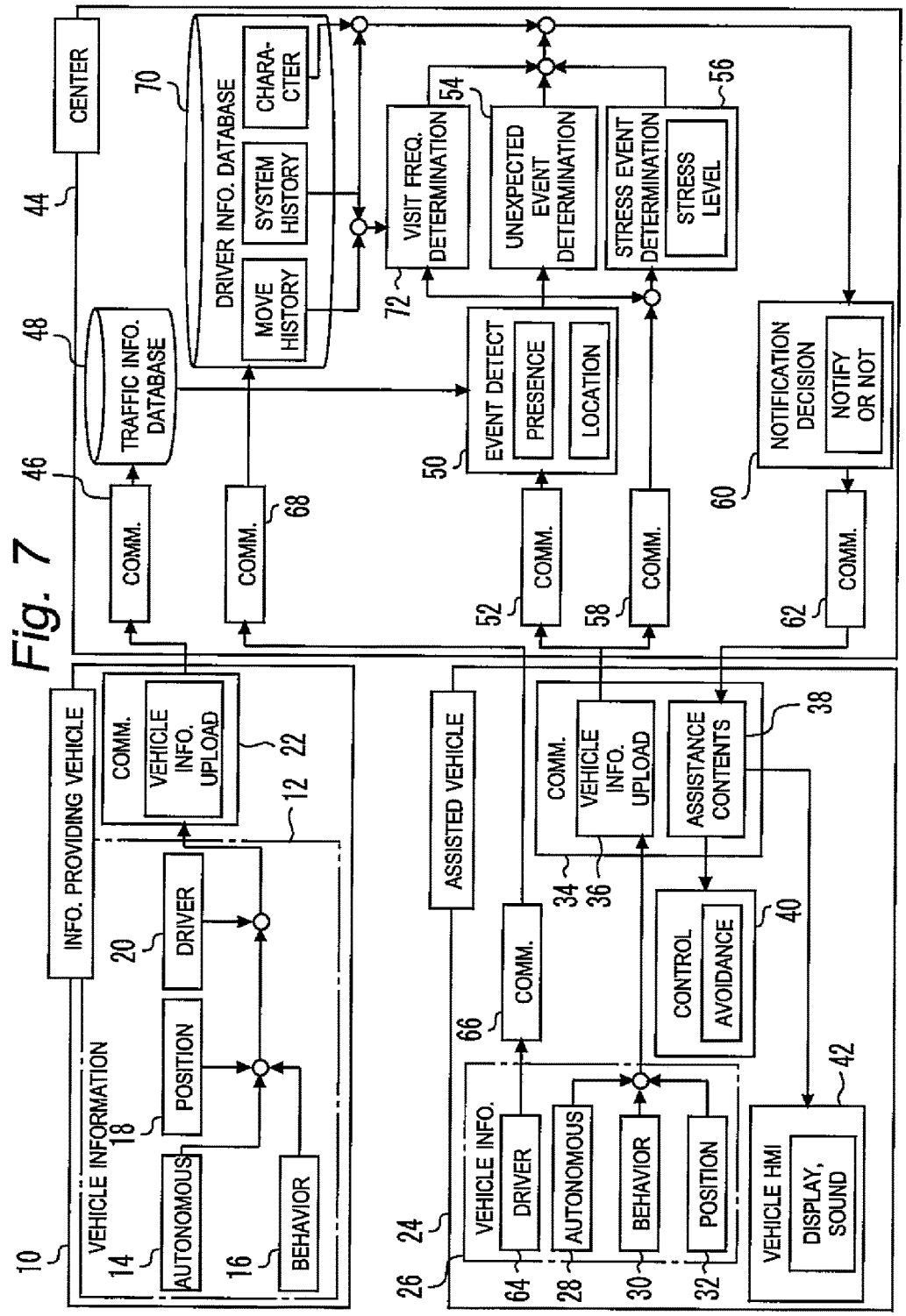
FIG. 7 is a block diagram for explaining a configuration of a second embodiment of the present invention.

FIG. 7 is a diagram for explaining a configuration according to a second embodiment of the present invention. In FIG. 7, the same components as in FIG. 4 are given the same reference numerals, and an overlapping description thereof will be omitted as appropriate. In the present embodiment, the vehicle information unit 26 of the assisted vehicle 24 includes a driver information unit 64. As in the case of the driver information unit 20 of the information providing vehicle 10, the driver information unit 64 includes an input interface for receiving driving skill information self-reported by the driver or a unit for diagnosing the driving skill, and an input interface for receiving various settings and requests from the driver.

The information obtained by the driver information unit 64 is uploaded to the center 44 through a communication unit 66. The center 44 has a communication unit 68 for receiving the uploaded information and a driver information database 70 for storing the uploaded information.

A movement history of the assisted vehicle 24 is recorded in the driver information database 70. The movement history includes a history regarding the vehicle position and time when the vehicle is running. Moreover, a system operation history is recorded in the driver information database 70. The system operation history includes information such as contents, date and time of the notification regarding the impediment event and the avoidance control that have been provided to the assisted vehicle 24. Furthermore, information of driver characteristics is recorded in the driver information database 70. The driver characteristics include information such as the various settings and requests from the driver of the assisted vehicle 24 and the driving skill of the driver.

The information of the movement history recorded in the driver information database 70 is supplied to a visit frequency determination unit 72. The information of the impediment event detected by the event detection unit 50, that is, the event being potentially the unexpected event or the stress event also is supplied to the visit frequency determination unit 72. The visit frequency determination unit 72 extracts, from the impediment event, an event that corresponds to the unexpected event for the driver because a frequency of visit by the driver to the location of occurrence of the event is low.

More specifically, the event extracted by the visit frequency determination unit 72 corresponds to the "regular event" and the "hour event" shown in FIG. 3. These events occur comparatively frequently and thus correspond to neither the low frequency event nor the low probability event. Therefore, the unexpected event determination unit 54 may not extract these events as the event to be notified. When the location of occurrence of the "regular event" or the "hour event" being the determination-target is outside the living area of the driver of the assisted vehicle 24, the visit frequency determination unit 72 extracts the determination-target event as the unexpected event. Moreover, when the "hour event" being the determination-target occurs during the off-activity hour of the assisted vehicle 24, the visit frequency determination unit 72 extracts the determination-target event as the unexpected event, even when the location of occurrence of the determination-target event is within the living area of the driver (see columns attached with (I) in FIG. 3).

In FIG. 7, the information of the movement history stored in the driver information database 70 is supplied to the visit frequency determination unit 72. This information can be supplied also to the unexpected event determination unit 54. As described above, the unexpected event determination unit 54 extracts the low probability event as the unexpected event. The low probability event is unexpected for a driver who has a preconceived idea that the specific on-road fixed object causes the impediment event with an extremely low probability. In another word, the low probability event is an expected impediment event for a driver who does not have such the preconceived idea. Here, a driver whose living area does not overlap an installation site of the on-road fixed object causing the low probability event does not know the characteristic feature of the on-road fixed object and thus does not have the above-mentioned preconceived idea. Therefore, it is also possible in the present embodiment that when the location of occurrence of an event detected as the low probability event is outside the living area of the driver of the assisted vehicle 24, the unexpected event determination unit 54 excludes the event from the unexpected event (see "expected" indicated in the right bottom column shown in FIG. 3).

Data of the unexpected event extracted by the visit frequency determination unit 72 as well as the events extracted by the unexpected event determination unit 54 and the stress event determination unit 56 are supplied to the notification decision unit 60. In the present embodiment, the information regarding the system operation history and the characteristics of the driver recorded in the driver information database 70 is supplied to the notification decision unit 60.

The notification decision unit 60 judges, based on the system operation history, whether or not there is a history that the event received from the unexpected event determination unit 54 and the like has been already notified to the assisted vehicle 24. If it is judged that there is such the history of notification, the notification decision unit 60 further calculates an elapsed time from the notification time to the current time. If the elapsed time is less than a predetermined threshold, the notification decision unit 60 treats this event as "not-to-be-notified". As a result of this processing, it is possible according to the system of the present embodiment to prevent the notification regarding the same impediment event from being provided repeatedly to the driver of the assisted vehicle 24 within a short period of time.

Moreover, the notification decision unit 60 can change the threshold used for making a final judgment of notification, based on the driver characteristics such as the various settings and requests from the driver and the driving skill of the driver that are recorded in the driver information database 70. Regarding the unexpected event extracted by the visit frequency determination unit 72, the frequency of visit by the driver is calculated as a parameter representing the notification necessity level. Regarding the unexpected event extracted by the unexpected event determination unit 54, the frequency of occurrence or the probability of occurrence of the event is calculated as the parameter. Regarding the stress event extracted by the stress event determination unit 56, the stress level is calculated as the parameter. The notification decision unit 60 compares the parameter with the threshold to make a final judgment on the notification. For example, the notification decision unit 60 changes the threshold such that more events are to be notified to the driver as the driver desires more notifications. As another example, the notification decision unit 60 changes the threshold such that more events are treated as "not-to-be-notified" as the driving skill of the driver becomes higher. As a result of these processes, it is possible to achieve a notification rule appropriate to the settings and requests from the driver and the driving skill of the driver.

Operation in Second Embodiment

Figure 8:
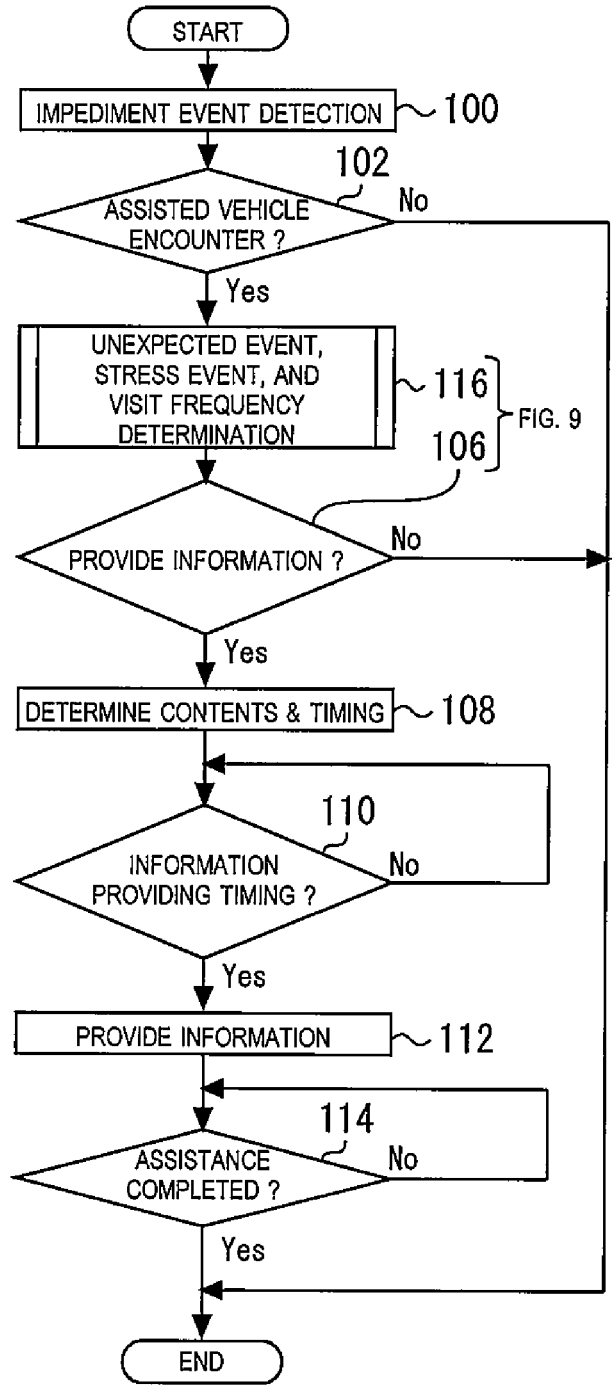
FIG. 8 is a flow chart for explaining an overview of processes executed in a center shown in FIG. 7.

FIG. 8 is a flow chart for explaining an overview of processes executed in the center 44 in the second embodiment of the present invention. The flow chart shown in FIG. 8 is the same as that shown in FIG. 5 except that Step 104 is replaced by Step 116. In Step 116, the process by the visit frequency determination unit 72 is executed in addition to the processes by the unexpected event determination unit 54 and the stress event determination unit 56.

Figure 9:
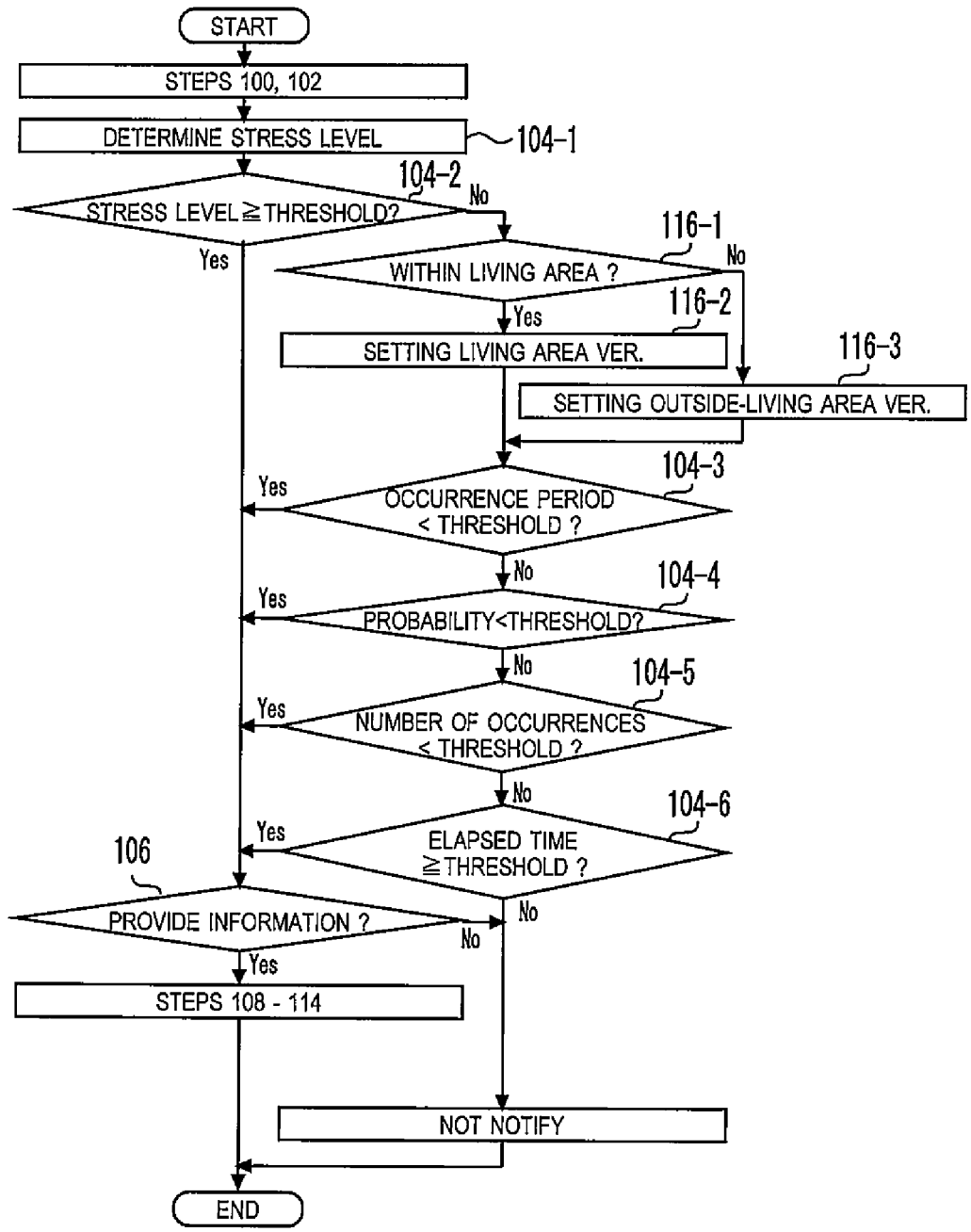
FIG. 9 is a flow chart for explaining details of Steps 128 and 106 shown in FIG. 8.

FIG. 9 is a flow chart for explaining the details of Step 116 and Step 106 for making a final judgment on the notification shown in FIG. 8. In the flow chart shown in FIG. 9, Steps 104-1 to 104-6 and Steps 116-1 to 116-3 correspond to Step 116 shown in FIG. 8.

In the routine shown in FIG. 9, if the determination at Step 104-2 results in "NO", then it is determined whether or not the location where the driver of the assisted vehicle 24 encounters the target event of the current cycle is within the living area of the driver (Step 116-1). This determination process is made based on the information of the current position included in the uploaded data from the assisted vehicle 24 and the movement history of the driver recorded in the driver information database 70.

If it is determined that the location of encounter with the target event is within the living area of the driver, then a setting of a living area version is selected (Step 116-2). On the other hand, if it is determined that the location of encounter is not within the living area of the driver, then a setting of an outside-living area version is selected (Step 116-3). The setting is reflected in the processes at Step 104-3 to 104-6 and Step 106.

More specifically, the setting of the living area version selected at Step 116-2 is further classified into two types. That is, it is first determined at Step 116-2 whether or not an encounter hour when the assisted vehicle 24 encounters the target event of the current cycle is included in the activity hour of the driver. If it is determined that the encounter hour is included in the activity hour, then a setting of an activity hour version is selected. On the other hand, if it is determined that the encounter hour is not included in the activity hour, then a setting of an off-activity hour version is selected.

When the setting of the activity hour version is selected at Step 116-2, the same processes as in the first embodiment are executed at Steps 104-3 to 104-6. In this case, the low frequency event and the low probability event are extracted as the unexpected event.

When the setting of the off-activity hour version is selected at Step 116-2, the above-mentioned Step 104-4 for extracting the low probability event is executed in the same manner as in the first embodiment. Accordingly, every low probability event is extracted as the unexpected event. Meanwhile, according to this setting, at the above-mentioned Steps 104-3, 104-5 and 104-6 for extracting the low frequency event, the hour event, which frequently occurs during the current hour but does not occur during the activity hour of the driver, is extracted in addition to the low frequency event extracted in the first embodiment. When the frequency of visit by the driver to the event occurrence site during the event occurrence hour is less than the threshold, the hour event is extracted as the unexpected event.

When the setting of the outside-living area version is selected at Step 116-3, the frequency of visit by the driver is taken into consideration at the above-mentioned Step 104-4 for extracting the low probability event. That is, if the frequency of visit by the driver is less than the threshold, then the extracted low probability event is not treated as the unexpected event. Moreover, at the above-mentioned Steps 104-3, 104-5 and 104-6 for extracting the low frequency event, the regular event and the hour event are extracted in addition to the low frequency event extracted in the first embodiment. If the frequency of visit by the driver is less than the threshold, then the extracted low frequency events including the regular event and the hour event are treated as the unexpected event.

According to the present embodiment, notification decision appropriate to the system operation history and the characteristics of the driver is made at the above-mentioned Step 106. Here, the processes by the notification decision unit 60 described above are executed. As a result, such an event that the elapsed time from the last notification regarding the event is short is treated as "not-to-be-notified". Moreover, the settings and the desires from the driver and the driving skill are reflected in possibility of providing the assisted vehicle 24 with the notification.

As described above, according to the system of the present embodiment, it is possible to decide the notification operation in consideration of the movement history and the characteristics of the driver. Therefore, according to the present embodiment, it is possible to further enhance usability for the driver, as compared with the system of the first embodiment.

Modification Examples of Second Embodiment

In the second embodiment described above, the movement history of the driver, the system operation history, the settings and the desires from the driver, and the driving skill of the driver are reflected in the final judgment on the notification of the unexpected event. Such the information can be reflected in the final judgment on the notification of the stress event.

Tolerance of the driver to the stress event is increased as the frequency of encounter with the same kind of stress event is increased. Therefore, when the characteristics of the driver and the like are reflected in the final judgment on the notification of the stress event, the threshold for the notification judgment can be modified such that the stress event is more likely to be "not-to-be-notified" as the number of encounters with or the frequency of encounter with the same kind of stress event becomes larger or higher.

It should be noted that in the second embodiment described above, the driver information database 70 corresponds to the "notification history database" in the thirteenth invention, the "driving skill database" in the fourteenth invention, and the "setting database" in the fifteenth invention.

Third Embodiment

Configuration of Third Embodiment

Figure 10:
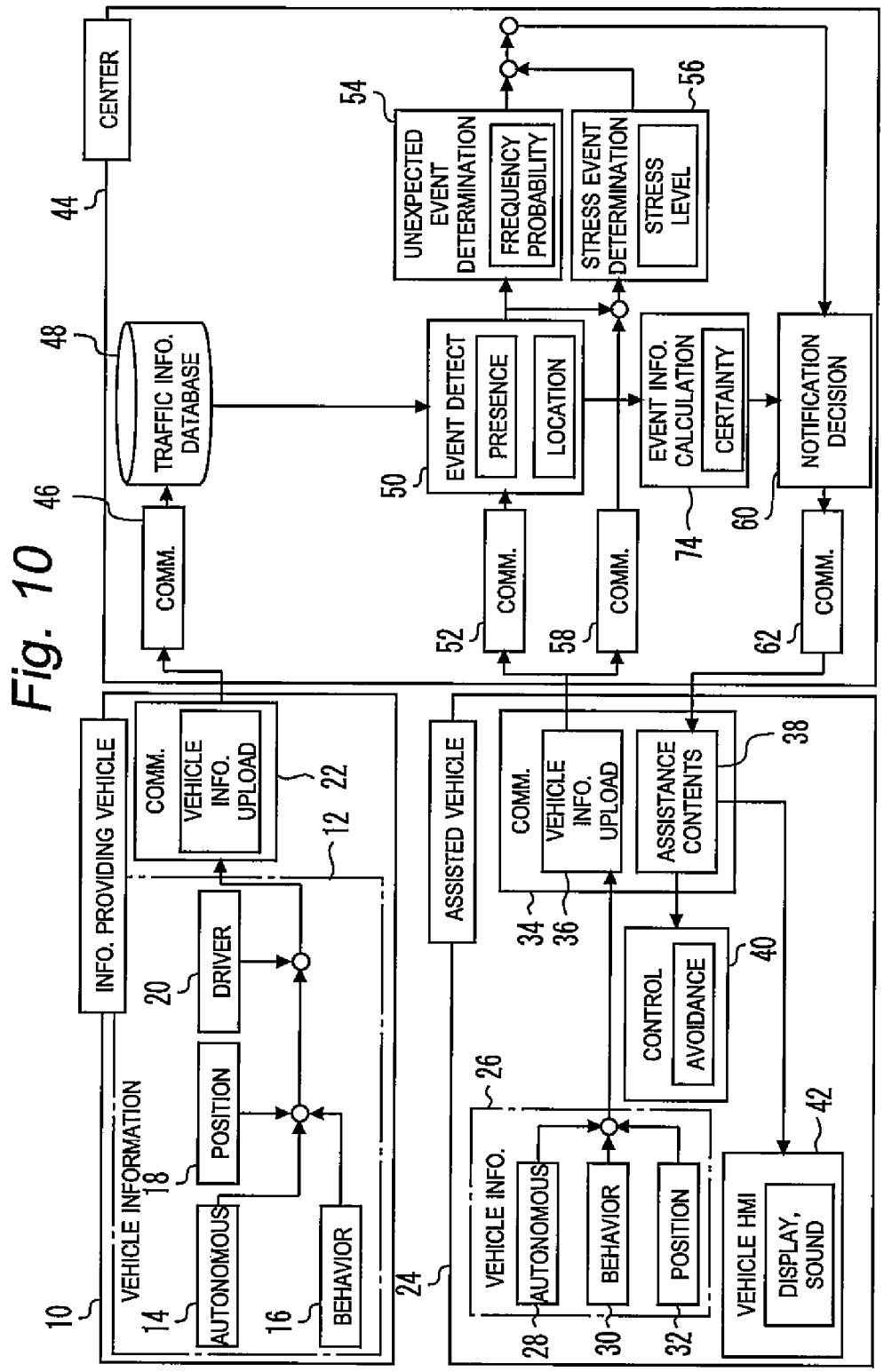
FIG. 10 is a block diagram for explaining a configuration of a third embodiment of the present invention.

FIG. 10 is a diagram for explaining a configuration according to a third embodiment of the present invention. In FIG. 10, the same components as in FIG. 4 are given the same reference numerals, and an overlapping description thereof will be omitted as appropriate. The system of the present embodiment is the same as the system of the first embodiment except that the center 44 is provided with an event information calculation unit 74.

Information regarding the impediment event detected by the event detection unit 50 is provided to the event information calculation unit 74. The event information calculation unit 74 executes a certainty level calculation process with respect to each impediment event provided. The data uploaded from the information providing vehicle and the like to the center 44 include not only data regarding an event confirmed by the on-vehicle camera and the like but also data regarding an event that is not yet confirmed (e.g. the avoidance action of the information providing vehicle 10). In the certainty level calculation process, such the uploaded data are used to calculate a certainty level of the impediment event detected by the event detection unit 50.

The certainty level is calculated based on the number, a rate, and contents of the uploaded data regarding the determination-target event. For example, when a data indicating the avoidance action is uploaded from the information providing vehicle 10 running at a specific location, it is possible to estimate that some impediment event is occurring at the specific location. When lots of data indicating the same kind of avoidance action are uploaded from a large number of information providing vehicles 10, it is possible to judge that an existing probability of the impediment event is high. As a rate of the avoidance action taken by the information providing vehicles 10 running at the specific location becomes higher, the existing probability can be judged to be higher. If the uploaded data include a data that identifies the impediment event itself such as a separated wheel and a disabled vehicle, it is possible to judge that the impediment event is almost certainly occurring at that location. In this manner, the certainty level can be expressed as a function of parameters including the above-mentioned number, rate, and contents of the uploaded data, such that the certainty level becomes higher as the existing probability of the impediment event becomes higher. In the certainty level calculation process, the certainty level is calculated by using the function.

The certainty level calculated by the event information calculation unit 74 is provided to the notification decision unit 60. According to the present embodiment, in the process of making the final judgement on the notification, the notification decision unit 60 judges whether or not the certainty level of the impediment event being the determination-target is equal to or higher than a notification threshold. If the certainty level is equal to or higher than the notification threshold, then it is judged that the determination-target event is to be notified. On the other hand, if the certainty level is less than the notification threshold, then it is judged that the determination-target event is not to be notified.

According to the processing described above, it is possible to appropriately prevent the driver from being notified of the information regarding the impediment event whose existence is uncertain. Therefore, according to the system of the present embodiment, it is possible to provide the driver of the assisted vehicle 24 with the notification with a further higher reliability as compared with the system of the first embodiment.

Operation in Third Embodiment

Figure 11:
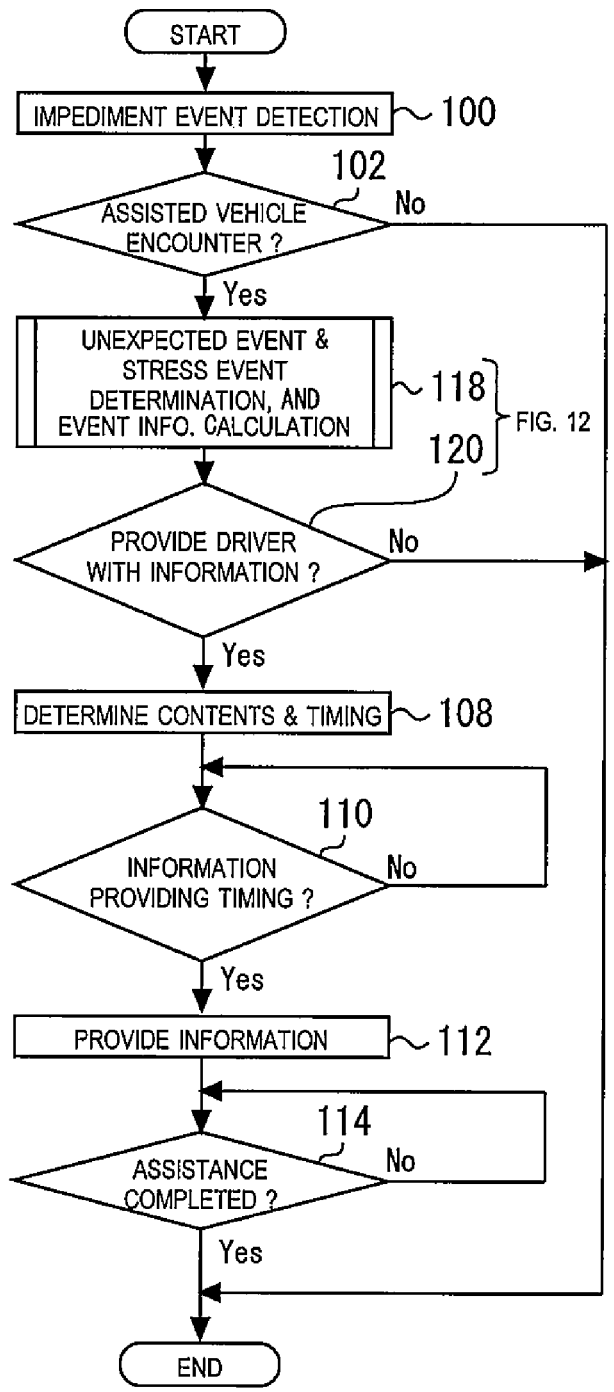
FIG. 11 is a flow chart for explaining an overview of processes executed in a center shown in FIG. 10.

FIG. 11 is a flow chart for explaining an overview of processes executed in the center 44 in the third embodiment of the present invention. The flow chart shown in FIG. 11 is the same as that shown in FIG. 5 except that Step 104 is replaced by Step 118 and Step 106 is replaced by Step 120. In Step 118, the process by the event information calculation unit 74 is executed in addition to the processes by the unexpected event determination unit 54 and the stress event determination unit 56. In Step 120, the process by the notification decision unit 60 is executed.

Figure 12:
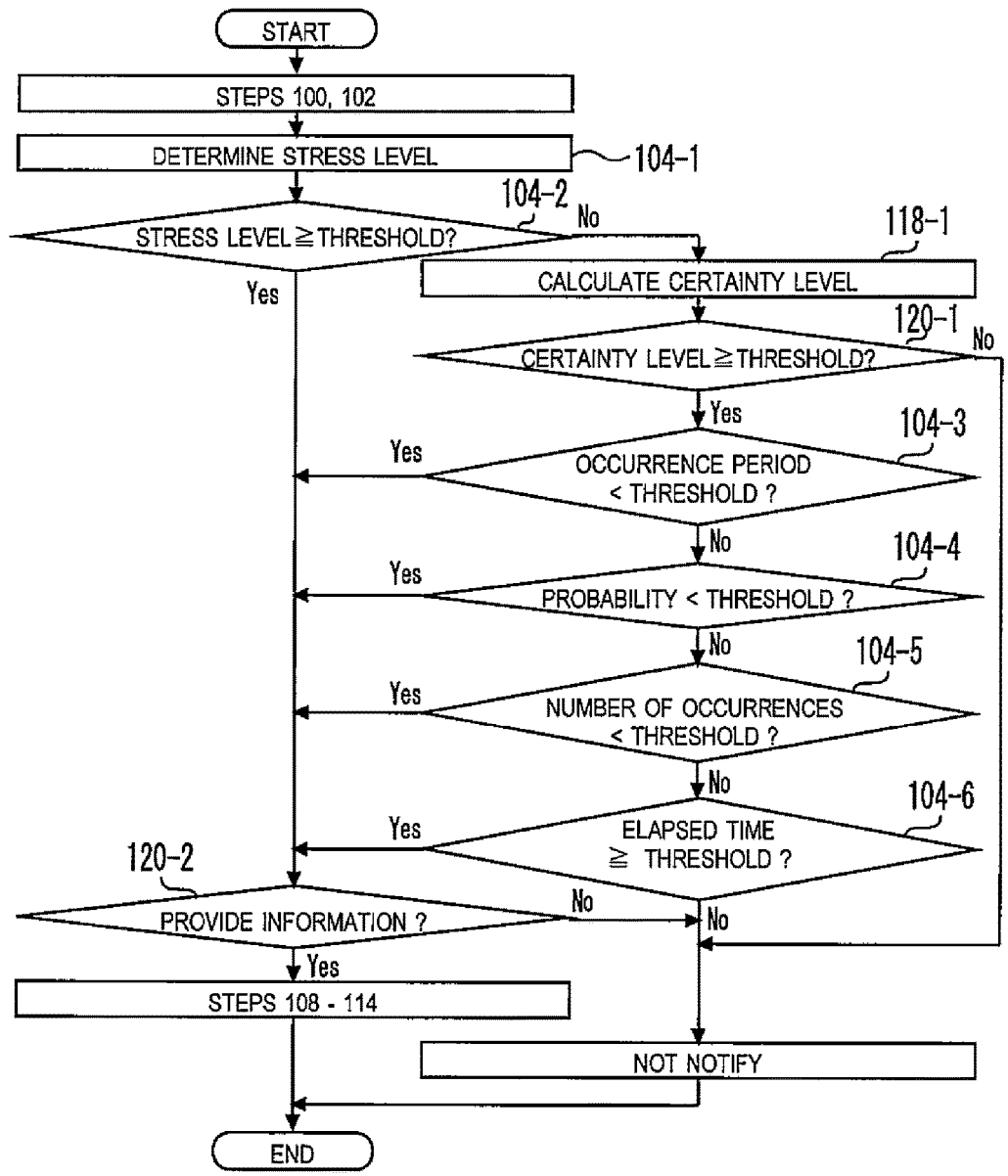
FIG. 12 is a flow chart for explaining details of Steps 142 and 106 shown in FIG. 11.

FIG. 12 is a flow chart for explaining the details of Step 118 and Step 120 shown in FIG. 11. In the flow chart shown in FIG. 12, Steps 104-1 to 104-6 and Step 118-1 correspond to Step 118 shown in FIG. 11. Steps 120-1 and 120-2 correspond to Step 120 shown in FIG. 11.

In the routine shown in FIG. 12, if the determination at Step 104-2 results in "NO", then the certainty level of the impediment event being the determination-target of the current cycle is calculated (Step 118-1). More specifically, the following processes are executed here.

1. counting the number of the uploaded data regarding the target impediment event.
2. calculating the rate of uploads of the data regarding the target impediment event from the information providing vehicles 10 passing through the location of occurrence of the target impediment event.
3. counting the number of uploads of data sufficient for identifying the contents of the target impediment event.
4. multiplying the results of the above-mentioned processes 1 to 3 by preset weighting coefficients, respectively.
5. calculating a sum of the respective results of the above-mentioned process 4 as the certainty level.

After that, it is determined whether or not the certainty level calculated by the processes described above is equal to or higher than the notification threshold (Step 120-1). If the certainty level is equal to or higher than the notification threshold, then the processes of Step 104-3 and thereafter are executed. On the other hand, if the certainty level is less than the notification threshold, it is judged that the determination-target event of the current cycle is not to be notified, and the processing in the current cycle is ended. It should be noted that substantially the same process as in Step 106 shown in FIG. 6 is executed at Step 120-2 in the flow chart shown in FIG. 12.

According to the processing described above, it is possible to notify the driver of the assisted vehicle 24 of only the impediment event whose existing probability is sufficiently high. Therefore, according to the system of the present embodiment, it is possible to further reduce unnecessary notifications and further improve the driver's confidence, as compared with the system of the first embodiment.

Modification Example of Third Embodiment

In the third embodiment described above, the final decision based on the certainty level is reflected in the notification of the unexpected event. The final decision based on the certainty level can be reflected in the notification of the stress event.

Fourth Embodiment

Configuration of Fourth Embodiment

Figure 13:
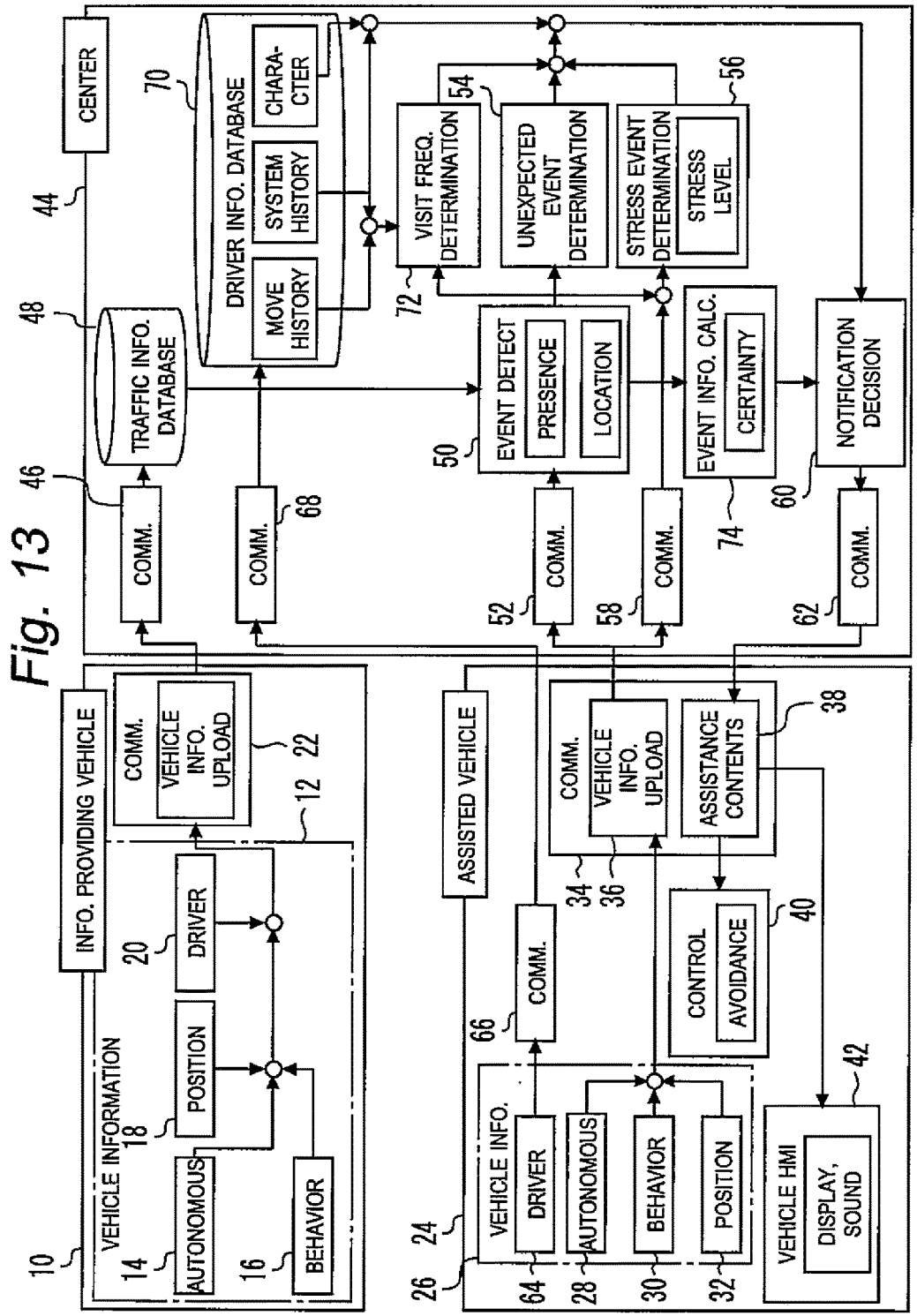
FIG. 13 is a block diagram for explaining a configuration of a fourth embodiment of the present invention.

FIG. 13 is a diagram for explaining a configuration according to a fourth embodiment of the present invention. In the present embodiment, the center 44 has both of the driver information database 70 shown in FIG. 7 and the event information calculation unit 74 shown in FIG. 10. Except for that, the system of the present embodiment is the same as the system of any of the first to third embodiments.

As in the case of the system of the second embodiment, the system of the present embodiment can determine whether or not to notify the impediment event, based on the movement history of the driver of the assisted vehicle 24, the system operation history, and the characteristics of the driver. Moreover, as in the case of the system of the third embodiment, the system of the present embodiment can make a final decision on whether or not to notify the impediment event, based on the certainty level of the impediment event.

Therefore, according to the system of the present embodiment, it is possible to further enhance the reliability of the notification, as compared with the system of any of the first to third embodiments. It should be noted that in the present embodiment, the processes executed by the center 44 are substantially the same as those in the case of the second embodiment or the third embodiment, and an overlapping description thereof is omitted here.

What is claimed is:

1. An information providing apparatus for a vehicle, comprising:
a traffic information database in which traffic information data are recorded; and
a data processing device configured to process the traffic information data to provide a driver of an assisted vehicle with a notification,
wherein the data processing device is configured to execute:

an event detection process that detects, based on the traffic information data, an impediment event that potentially impedes vehicle running;
an event extraction process that extracts the impediment event potentially encountered by the assisted vehicle;
a determination value calculation process that calculates a notification necessity level for the impediment event based on comparing a frequency associated with the impediment event and a frequency threshold; and
a notification process that provides the driver of the assisted vehicle with the notification regarding the impediment event potentially encountered by the assisted vehicle only when the notification necessity level is greater than a notification necessity level threshold,
wherein the determination value calculation process includes an unexpected event determination process that calculates the notification necessity level or the notification necessity level threshold
such that the notification regarding the impediment event whose frequency of occurrence is lower is more likely to be provided than an impediment event whose frequency of occurrence is more likely to occur.

2. The information providing apparatus for a vehicle according to claim 1,
wherein the data processing device is further configured to execute a traffic information recording process that records, in the traffic information database, the traffic information data received from an information providing vehicle.

3. The information providing apparatus for a vehicle according to claim 2,
wherein the traffic information data includes:
positional information of the information providing vehicle; and
vehicle behavior information of the information providing vehicle.

4. The information providing apparatus for a vehicle according to claim 2,
wherein the traffic information data includes:
positional information of the information providing vehicle; and
a result of detection by a surrounding monitoring sensor that is installed in the information providing vehicle for monitoring a surrounding situation.

5. The information providing apparatus for a vehicle according to claim 1,
wherein the frequency of occurrence becomes lower as a period of occurrence of the impediment event within a defined period of time becomes shorter.

6. The information providing apparatus for a vehicle according to claim 1,
wherein the frequency of occurrence becomes lower as an interval of occurrence of the impediment event becomes longer.

7. The information providing apparatus for a vehicle according to claim 1,
wherein the determination value calculation process includes an unexpected event determination process that calculates the notification necessity level or the notification necessity level threshold such that the notification regarding the impediment event whose probability of occurrence is lower is more likely to be provided.

8. The information providing apparatus for a vehicle according to claim 7,
wherein there is a population of on-road fixed objects, a state of each of the on-road fixed objects is switchable between a plurality of states,
the impediment event is caused when the state is switched to one of the plurality of states, and
the probability of occurrence is defined for each of the on-road fixed objects as probability of occurrence of the one state causing the impediment event.

9. The information providing apparatus for a vehicle according to claim 8, further comprising a driver information database in which a movement history of the driver of the assisted vehicle is recorded,
wherein the determination value calculation process further includes a visit frequency determination process that calculates, based on the movement history, a frequency of visit by the driver to a place where the assisted vehicle is running, and
the unexpected event determination process calculates the notification necessity level or the notification necessity level threshold such that the notification regarding the impediment event related to an on-road fixed object is less likely to be provided as the frequency of visit by the driver to an installation site of the on-road fixed object is lower.

10. The information providing apparatus for a vehicle according to claim 1, further comprising a driver information database in which a movement history of the driver of the assisted vehicle is recorded,
wherein the determination value calculation process further includes a visit frequency determination process that calculates, based on the movement history, a frequency of visit by the driver to a place where the assisted vehicle is running, and
the determination value calculation process calculates the notification necessity level or the notification necessity level threshold such that the notification regarding the impediment event is more likely to be provided as the frequency of visit by the driver to a location of occurrence of the impediment event is lower.

11. The information providing apparatus for a vehicle according to claim 10,
wherein the visit frequency determination process calculates the frequency of visit by the driver during current hours, and
the determination value calculation process calculates the notification necessity level or the notification necessity level threshold based on the frequency of visit by the driver during the current hours.

12. The information providing apparatus for a vehicle according to claim 1, further comprising a notification history database in which a history of the notification regarding the impediment event to the assisted vehicle is recorded,
wherein the notification process includes a process that makes an interval of the notification regarding a same impediment event to a same assisted vehicle equal to or more than a certain period of time.

13. The information providing apparatus for a vehicle according to claim 1, further comprising a driving skill database in which information regarding a driving skill of the driver of the assisted vehicle is recorded,
wherein the notification process includes a process that makes the notification less likely to be provided to the driver whose driving skill is higher.

14. The information providing apparatus for a vehicle according to claim 1, further comprising a setting database in which settings regarding the notification set by the driver of the assisted vehicle are recorded, wherein the notification process includes a process that reflects the settings in possibility of providing the driver with the notification.

15. The information providing apparatus for a vehicle according to claim 1,
wherein the data processing device is further configured to execute a certainty level calculation process that calculates, based on the traffic information data, a certainty level of the impediment event, and
the notification process provides the driver of the assisted vehicle with the notification regarding the impediment event having the certainty level equal to or higher than a notification threshold.

16. The information providing apparatus for a vehicle according to claim 1,
wherein the determination value calculation process includes a stress event determination process that calculates the notification necessity level or the notification necessity level threshold such that the notification regarding the impediment event giving greater stress to the driver is more likely to be provided.

17. The information providing apparatus for a vehicle according to claim 16, further comprising a driver information database in which a movement history of the driver of the assisted vehicle is recorded,
wherein the stress event determination process includes:
a process of calculating, based on the movement history, a frequency of encounter by the driver with the impediment event; and
a process of calculating the notification necessity level or the notification necessity level threshold such that the notification regarding the impediment event with a higher frequency of encounter is less likely to be provided.

18. The information providing apparatus for a vehicle according to claim 1,
wherein the notification necessity level threshold is a single notification necessity level threshold associated with multiple detected impediment events.

19. The information providing apparatus for a vehicle according to claim 1, wherein the determination value calculation process comprises:
determining whether the impediment event satisfies a first condition that corresponds to a period of occurrence of the impediment event within a defined period being less than a period of occurrence threshold;
selectively determining whether the impediment event satisfies a second condition that corresponds to a number of occurrences of the impediment event within a defined period of time being less than a number of occurrences threshold based on determining whether the impediment event satisfies the first condition; and
selectively determining whether the impediment event satisfies a third condition that corresponds to an elapsed time from a previous occurrence of the impediment event at a location of occurrence of the impediment event being equal to or greater than an elapsed time from a previous occurrence threshold based on determining whether the impediment satisfies the second condition, and
wherein comparing the frequency associated with the impediment event and the frequency threshold corresponds to at least one of determining whether the impediment event satisfies the first condition, the second condition, or the third condition.

20. The information providing apparatus for a vehicle according to claim 1, wherein the determination value calculation process comprises:
determining whether a location of the impediment event is within a living area of the driver or outside of the living area of the driver; and
calculating the notification necessity level for the impediment event based on determining whether the location of the impediment event is within the living area of the driver or outside of the living area of the driver.

* * * * *